(12) United States Patent
Masui

(10) Patent No.: US 7,911,705 B2
(45) Date of Patent: Mar. 22, 2011

(54) PROJECTION LENS AND PROJECTOR

(75) Inventor: Atsuo Masui, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 31 days.

(21) Appl. No.: 12/490,490

(22) Filed: Jun. 24, 2009

(65) Prior Publication Data

US 2009/0323197 A1 Dec. 31, 2009

(30) Foreign Application Priority Data

Jun. 27, 2008 (JP) ................. 2008-169197

(51) Int. Cl.
*G02B 9/00* (2006.01)
*G02B 15/14* (2006.01)
(52) U.S. Cl. ........ 359/651; 359/649; 359/676; 359/683; 359/684; 359/691

(58) Field of Classification Search .......... 359/649–651, 359/686–690, 682–684, 676; 348/240.99–240.3; 396/72–88
See application file for complete search history.

(56) References Cited

U.S. PATENT DOCUMENTS

| | | | |
|---|---|---|---|
| 5,278,698 A | 1/1994 | Iizuka et al. | 359/682 |
| 5,900,987 A * | 5/1999 | Kreitzer | 359/649 |
| 6,188,522 B1 * | 2/2001 | Kimura et al. | 359/649 |
| 7,170,691 B2 | 1/2007 | Sawamoto | 359/680 |

FOREIGN PATENT DOCUMENTS

| JP | 2004-109896 A | 4/2004 |
|---|---|---|
| JP | 2005-43607 A | 2/2005 |

* cited by examiner

*Primary Examiner* — Ricky L Mack
*Assistant Examiner* — Zachary Wilkes
(74) *Attorney, Agent, or Firm* — Sidley Austin LLP

(57) ABSTRACT

An object of the invention is to provide a projection lens capable of sufficiently correcting lateral chromatic aberration at both of the wide-angle end and the telephoto end, with an increased zoom ratio, a less number of lens elements, and less variation in telecentricity.

20 Claims, 23 Drawing Sheets

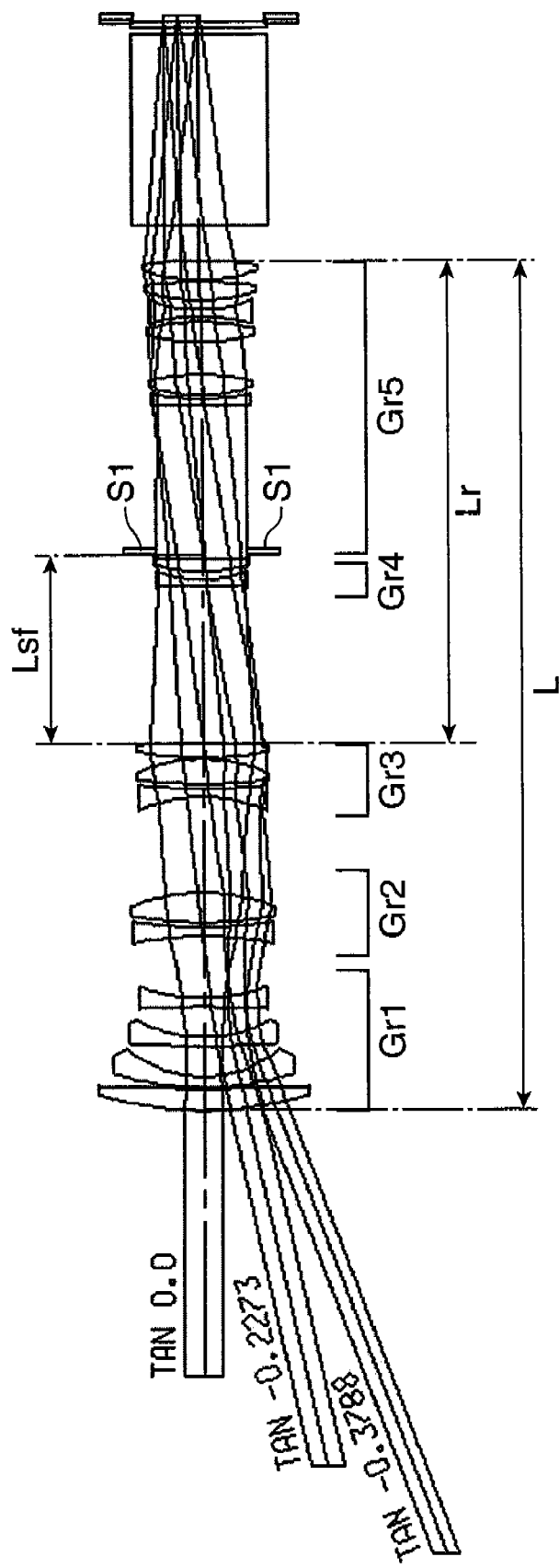

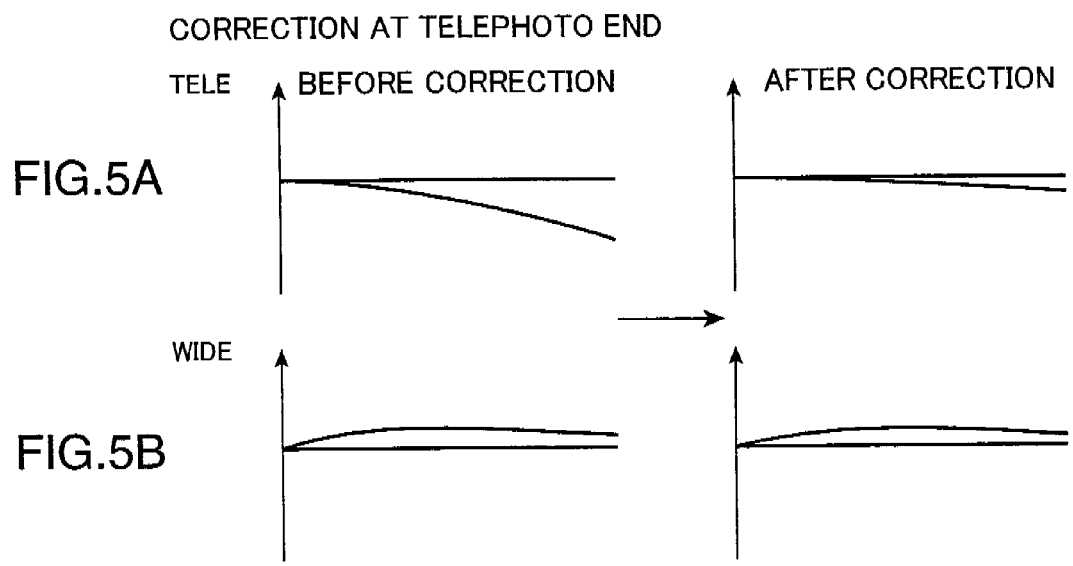
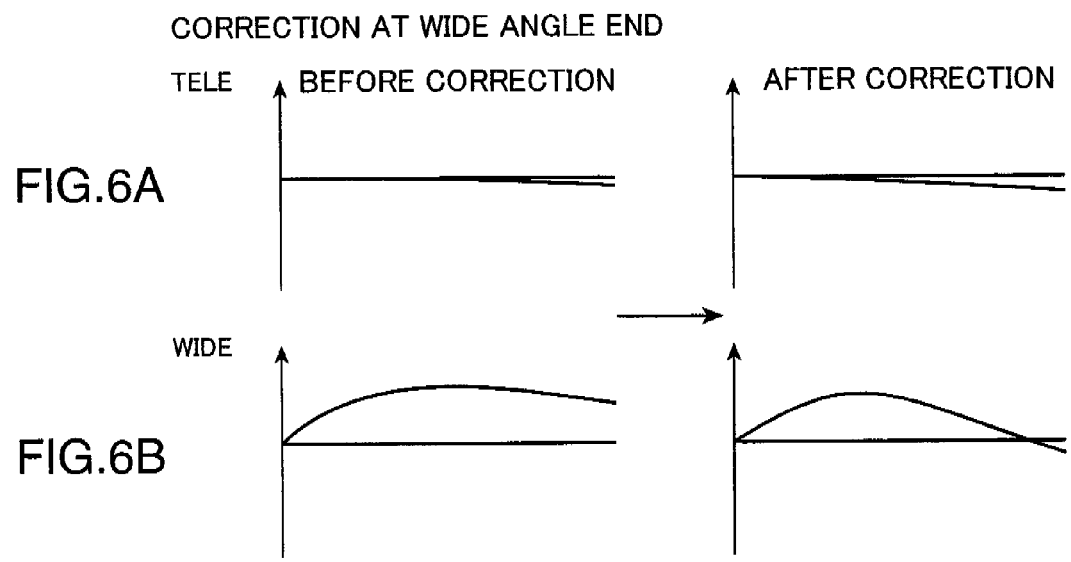

SPHERICAL ABERRATION
SINE CONDITION

ASTIGMATISM

% DISTORTION

LATERAL CHROMATIC ABERRATION

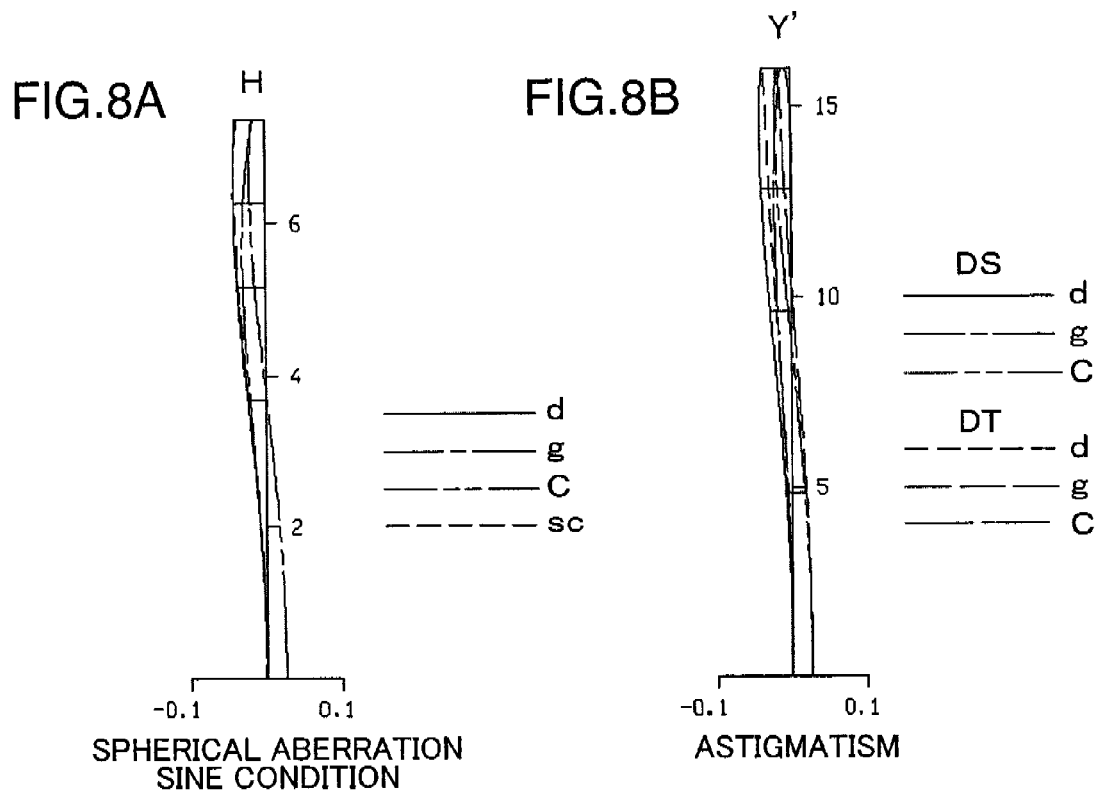
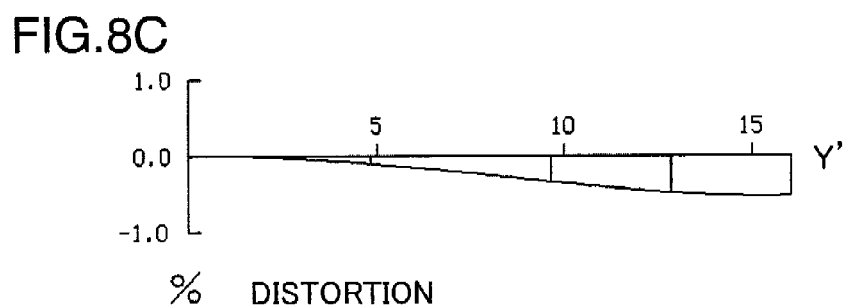
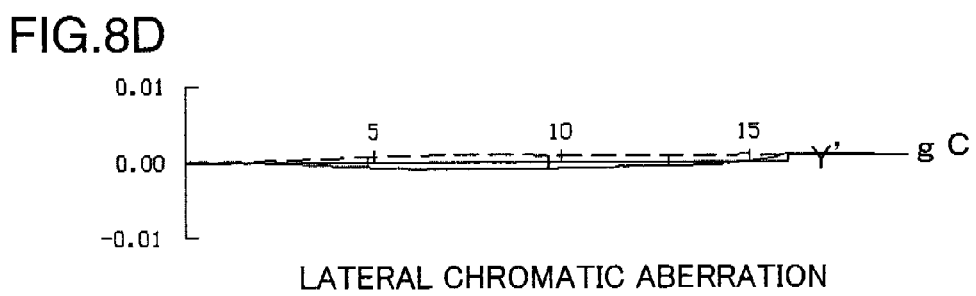

SPHERICAL ABERRATION
SINE CONDITION

ASTIGMATISM

% DISTORTION

LATERAL CHROMATIC ABERRATION

WIDE ANGLE END

MIDDLE FOCAL LENGTH POSITION

SPHERICAL ABERRATION
SINE CONDITION

ASTIGMATISM

% DISTORTION

LATERAL CHROMATIC ABERRATION

SPHERICAL ABERRATION
SINE CONDITION

ASTIGMATISM

% DISTORTION

LATERAL CHROMATIC ABERRATION

SPHERICAL ABERRATION
SINE CONDITION

ASTIGMATISM

% DISTORTION

LATERAL CHROMATIC ABERRATION

FIG.18 WIDE ANGLE END

MIDDLE FOCAL LENGTH POSITION

SPHERICAL ABERRATION
SINE CONDITION

ASTIGMATISM

% DISTORTION

LATERAL CHROMATIC ABERRATION

SPHERICAL ABERRATION
SINE CONDITION

ASTIGMATISM

% DISTORTION

LATERAL CHROMATIC ABERRATION

FIG.23A
FIG.23B
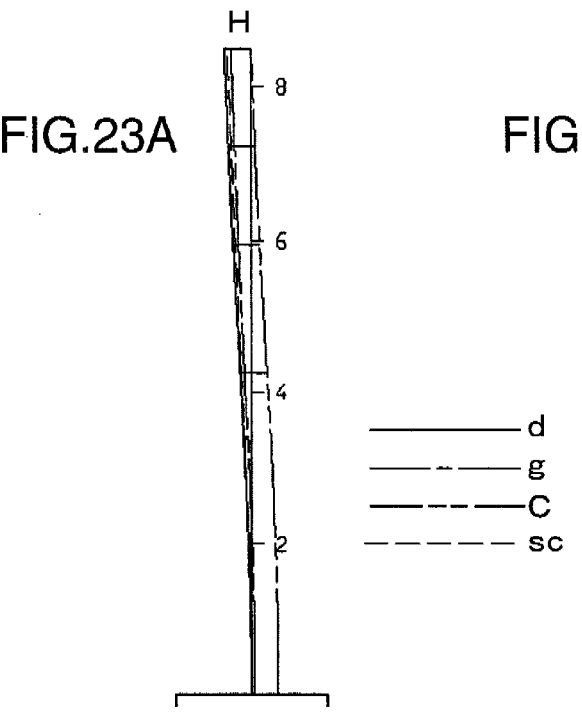
SPHERICAL ABERRATION
SINE CONDITION
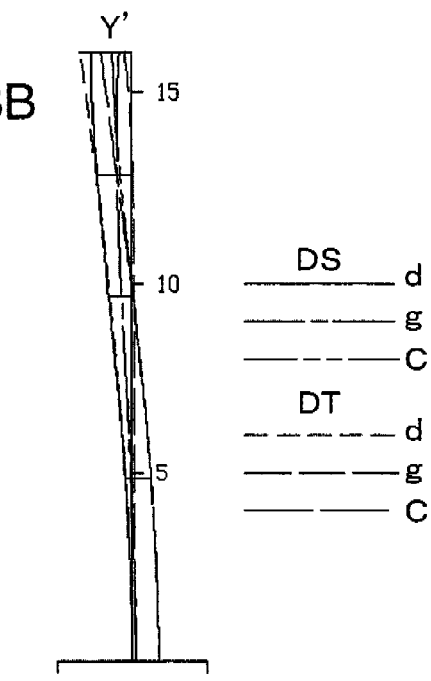
ASTIGMATISM
FIG.23C
% DISTORTION
FIG.23D
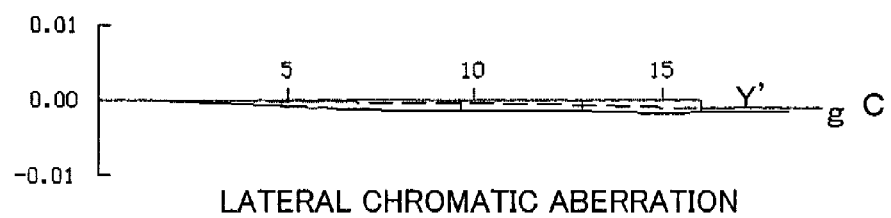
LATERAL CHROMATIC ABERRATION

PROJECTION LENS AND PROJECTOR

This application is based on Japanese Patent Application No. 2008-169197 filed on Jun. 27, 2008, the contents of which are hereby incorporated by reference.

BACKGROUND OF THE INVENTION AND RELATED ART STATEMENT

1. Field of the Invention

The present invention relates to a projection lens for use in e.g. a projector having a zoom function, and more particularly to a projection lens for enlarging and projecting an image generated by e.g. a liquid crystal panel or a digital micromirror device onto a screen.

2. Description of the Related Art

There is widely known use of a glass material having an anomalous dispersion characteristic for correcting lateral chromatic aberration of a lens. Unlike a general glass material, the glass material having an anomalous dispersion characteristic has a feature that a graph representing a relation between a partial dispersion ratio and the Abbe number is greatly displaced from a straight line.

The partial dispersion ratio Pg, F; and the Abbe number Vd are respectively represented by the following conditional expressions.

$$Pg, F = (ng - nF)/(nF - nC)$$

where ng is a refractive index with respect to g-line, nF is a refractive index with respect to F-line, and nC is a refractive index with respect to C-line.

$$Vd = (nd - 1)/(nF - nC)$$

where nd is a refractive index with respect to d-line.

In the specification, as compared with a dispersion characteristic of a general glass material, a lens element made of a glass material having relatively large refractive indexes with respect to red light and blue light is called as a lens element made of a glass material having an anomalous dispersion characteristic of Lang (hereinafter, simply called as "a lens element having Lang characteristic"); and a lens element made of a glass material having relatively small refractive indexes with respect to red light and blue light is called as a lens element made of a glass material having an anomalous dispersion characteristic of Kurz (hereinafter, simply called as "a lens element having Kurz characteristic").

Specifically, a lens element made of an anomalous dispersion glass material has the following features.

i) In the case where a positive lens element having Lang characteristic is disposed on the reduction side of a diaphragm, lateral chromatic aberration occurs on the minus side.

ii) In the case where a positive lens element having Lang characteristic is disposed on the enlargement side of a diaphragm, lateral chromatic aberration occurs on the plus side.

iii) In the case where a negative lens element having Lang characteristic is disposed on the reduction side of a diaphragm, lateral chromatic aberration occurs on the plus side.

iv) In the case where a negative lens element having Lang characteristic is disposed on the enlargement side of a diaphragm, lateral chromatic aberration occurs on the minus side.

In the specification, the expression "lateral chromatic aberration occurs on the plus side" means that a projected image of red light or blue light is formed at a position closer to the center of a screen with respect to a projected image of green light; and the expression "lateral chromatic aberration occurs on the minus side" means that a projected image of red light or blue light is formed at a position closer to a periphery of a screen with respect to a projected image of green light. In the case where a lens element having Kurz characteristic is used, lateral chromatic aberration occurs in a reverse manner as described above.

In recent years, high magnification zoom lenses compatible with various photographing conditions have been demanded. In the case where the zoom ratio is increased in the high magnification zoom lenses, it is difficult to obtain an optimal lens arrangement that enables to minimize lateral chromatic aberration at both of the wide-angle end and the telephoto end. In order to satisfy the above requirement, an increased number of lens elements is required, and the production cost may be increased.

In the case where the zoom ratio is large, the positive power by a positive lens element is dominant at the wide-angle end where the power is increased among all the lens groups. In view of this, there is proposed an idea, wherein an optimal lens arrangement is set at the telephoto end, and a movable lens group is disposed in front of a diaphragm to suppress variation in telecentricity. In this arrangement, however, correction by the positive lens element may be excessive, and lateral chromatic aberration may occur on the plus side.

On the other hand, lateral chromatic aberration may occur on the minus side at the telephoto end. In other words, as a principle, lateral chromatic aberration is likely to occur on the plus side at the wide-angle end, and lateral chromatic aberration is likely to occur on the minus side at the telephoto end.

In order to correct the lateral chromatic aberration, U.S. Pat. No. 5,278,698, JP2004-109896, U.S. Pat. No. 7,170,691, and JP2005-43607 disclose zoom lenses, wherein a lens element having a large anomalous dispersion characteristic is arranged in a lens group having a large moving amount.

In the zoom lens recited in U.S. Pat. No. 5,278,698, since the moving amount of a lens group on the reduction side is large, telecentricity may vary by a zooming operation.

In the zoom lenses recited in JP2004-109896, U.S. Pat. No. 7,170,691, and JP2005-43607, the distance between a lens group having a maximum moving amount, and a diaphragm is not significantly changed during a zooming operation. Accordingly, the light flux passing position through the lens group is not significantly changed during the zoom operation, and lateral chromatic aberration which may vary by a zooming operation cannot be sufficiently corrected. In other words, in the zoom lenses recited in JP2004-109896, U.S. Pat. No. 7,170,691, and JP2005-43607, the effect of correcting lateral chromatic aberration is substantially the same between the wide-angle end and the telephoto end. Accordingly, a difference in lateral chromatic aberration between the wide-angle end and the telephoto end may remain unchanged, and fine lateral chromatic aberration correction cannot be performed in the entire zoom range.

SUMMARY OF THE INVENTION

In view of the above, it is an object of the present invention to provide a projection lens capable of sufficiently correcting lateral chromatic aberration at both of the wide-angle end and the telephoto end, with an increased zoom ratio, a less number of lens elements, and less variation in telecentricity.

A projection lens according to an aspect of the invention includes at least two movable lens groups to be moved in zooming, wherein one of the movable lens groups having a maximum moving amount includes at least one positive lens element having a positive power, the movable lens group having the maximum moving amount is arranged on an enlargement side with respect to a diaphragm, and is operable to move toward the diaphragm in zooming from a telephoto end to a wide-angle end, and the movable lens group having the maximum moving amount and the positive lens element satisfy the following conditional expressions (1) through (3)

$$Pg, F + 0.00181 Vd > 0.652 \quad (1)$$

$$0.5 < Lr/L < 0.8 \quad (2)$$

$$1.2 < Lsf/Lsr < 5 \quad (3)$$

where
Pg, F: a partial dispersion ratio of a lens glass material of the positive lens element,
Vd: an Abbe number of the lens glass material of the positive lens element,
Lr: a distance between an apex of a reduction-side lens surface in the movable lens group having the maximum moving amount, and an apex of a reduction-side lens surface in all the lens groups, in the case where the movable lens group having the maximum moving amount is moved to a position closest to the enlargement side in zooming,
L: a lens length of all the lens groups, in the case where the movable lens group having the maximum moving amount is moved to the position closest to the enlargement side in zooming,
Lsf: a distance between the apex of the reduction-side lens surface in the movable lens group having the maximum moving amount, and a surface of the diaphragm, in the case where the movable lens group having the maximum moving amount is moved to the position closest to the enlargement side in zooming, and
Lsr: a distance between the apex of the reduction-side lens surface in the movable lens group having the maximum moving amount, and the surface of the diaphragm, in the case where the movable lens group having the maximum moving amount is moved to a position closest to a reduction side in zooming.

These and other objects, features and advantages of the present invention will become more apparent upon reading the following detailed description along with the accompanying drawings.

BRIEF DESCRIPTION OF THE DRAWINGS

FIG. 4 is an optical path diagram of the projection lens at a telephoto end.
FIGS. 5A and 5B are diagrams showing effects of correcting lateral chromatic aberration of the projection lens in the first embodiment.
FIGS. 6A and 6B are diagrams schematically showing effects of correcting lateral chromatic aberration of a projection lens as a conventional example.
FIGS. 8A through 8D are aberration diagrams of Example 1 of the projection lens in accordance with the first embodiment.

FIGS. 23A through 23D are aberration diagrams of Example 3 of the projection lens in accordance with the third embodiment.

DETAILED DESCRIPTION OF THE PREFERRED EMBODIMENTS OF THE INVENTION

The invention is now described, by way of example, with reference to the accompanying drawings.

First Embodiment

Figure 1:
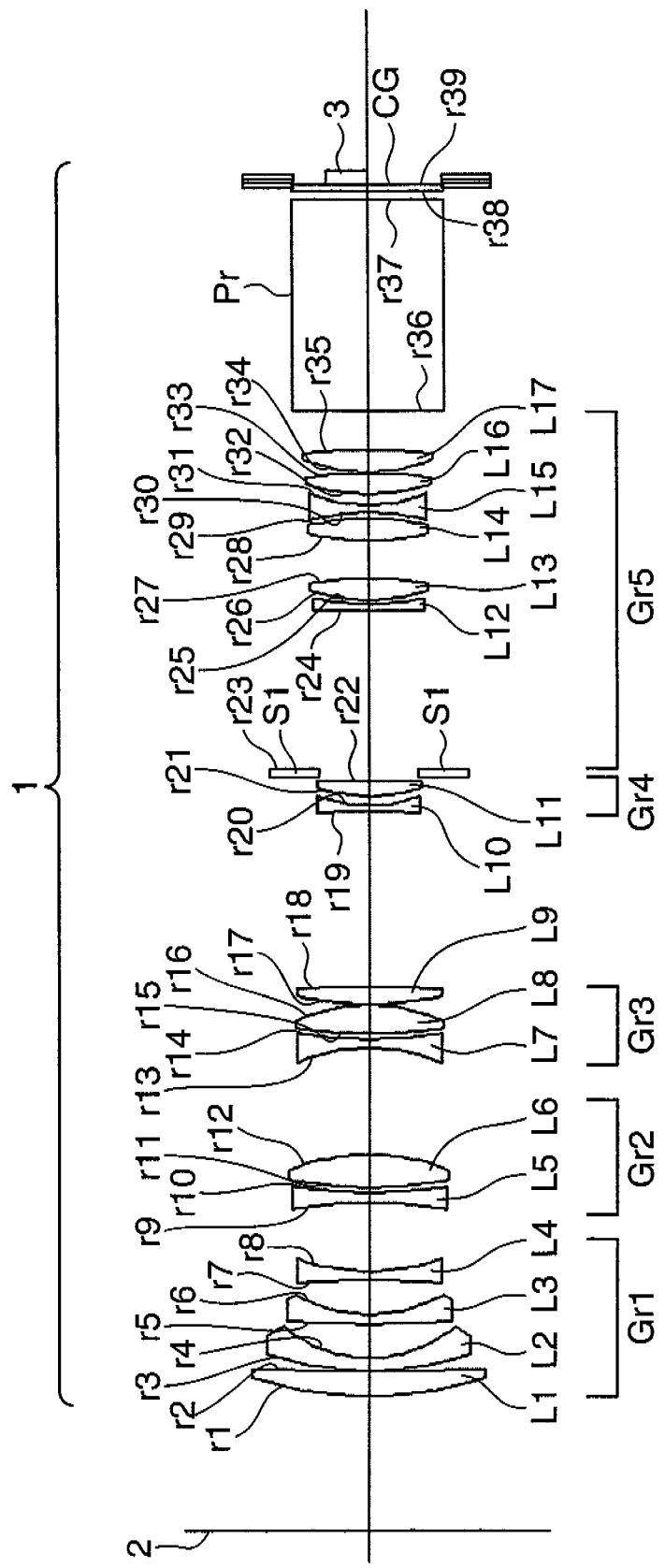
FIG. 1 is a lens arrangement diagram of a projection lens in accordance with the first embodiment of the invention.
Figure 2:
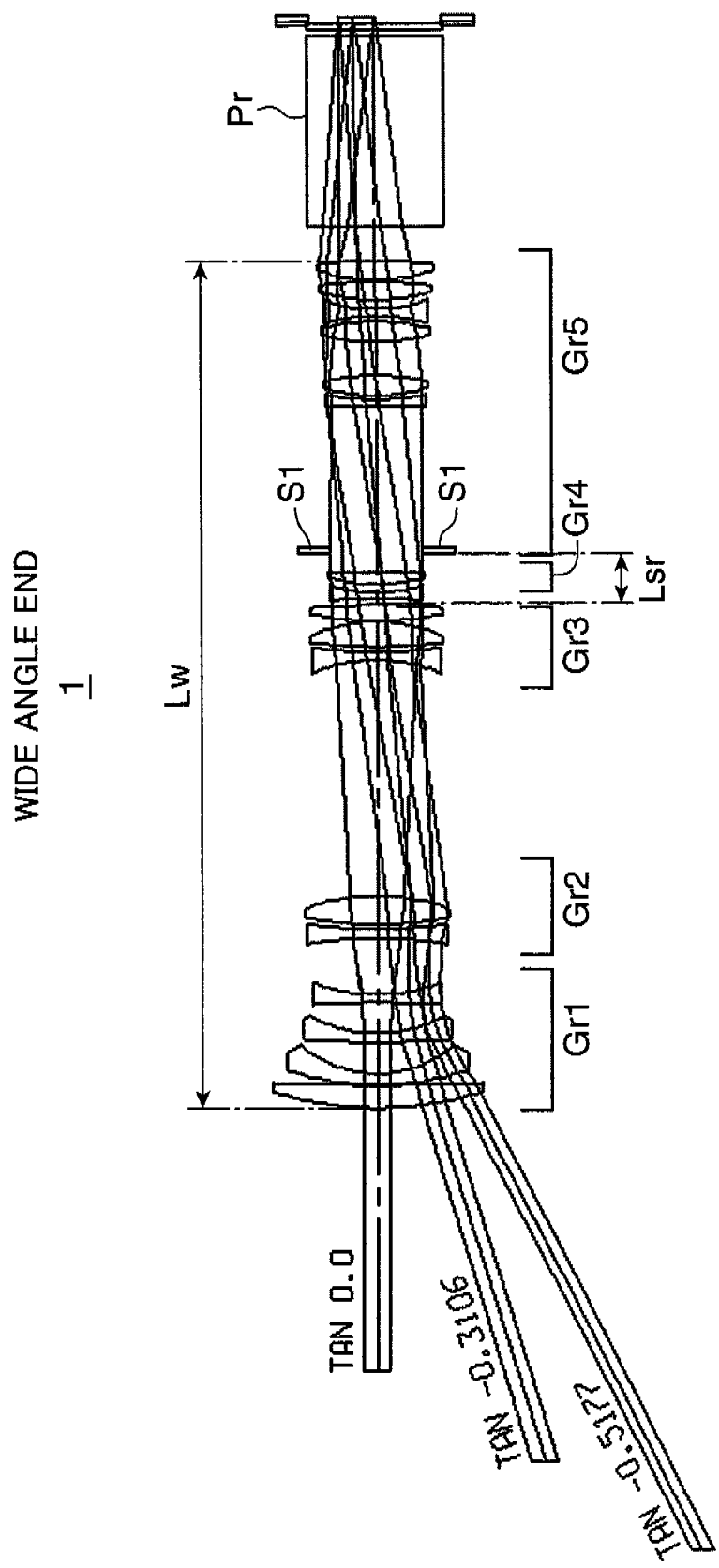
FIG. 2 is an optical path diagram of the projection lens at a wide-angle end.
Figure 3:
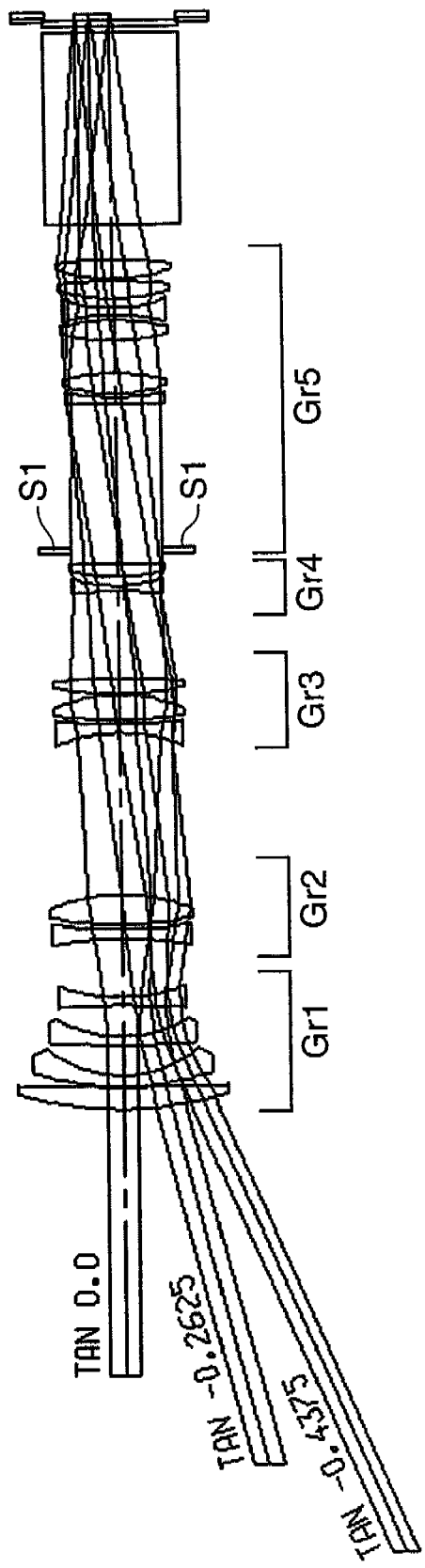
FIG. 3 is an optical path diagram of the projection lens in a middle focal length position.
Figure 7A:
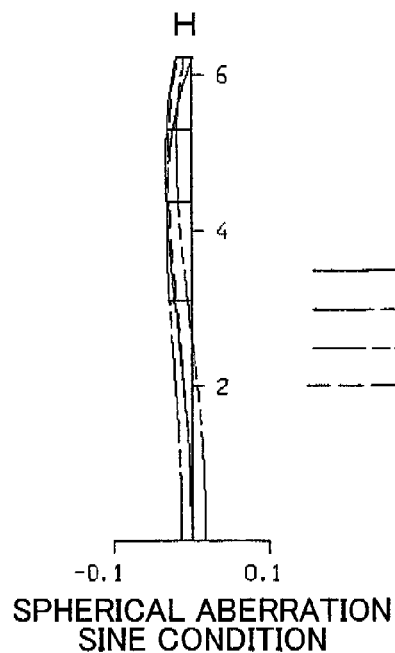
FIGS. 7A through 7D are aberration diagrams of Example 1 of the projection lens in accordance with the first embodiment.
Figure 7B:
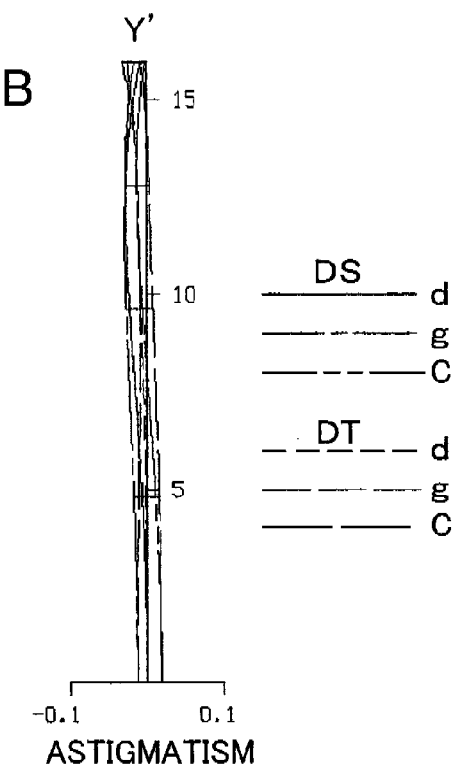
Figure 7C:
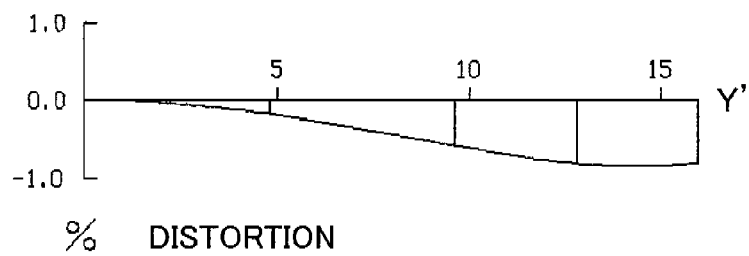
Figure 7D:
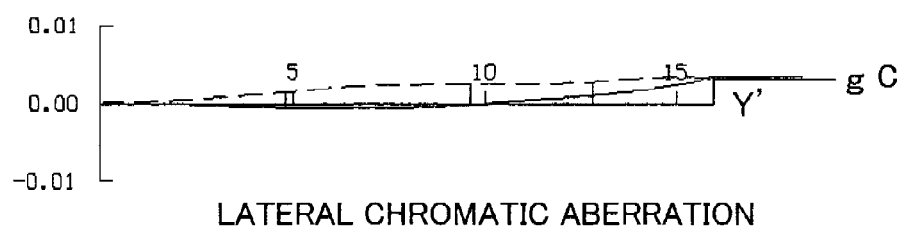
Figure 24:
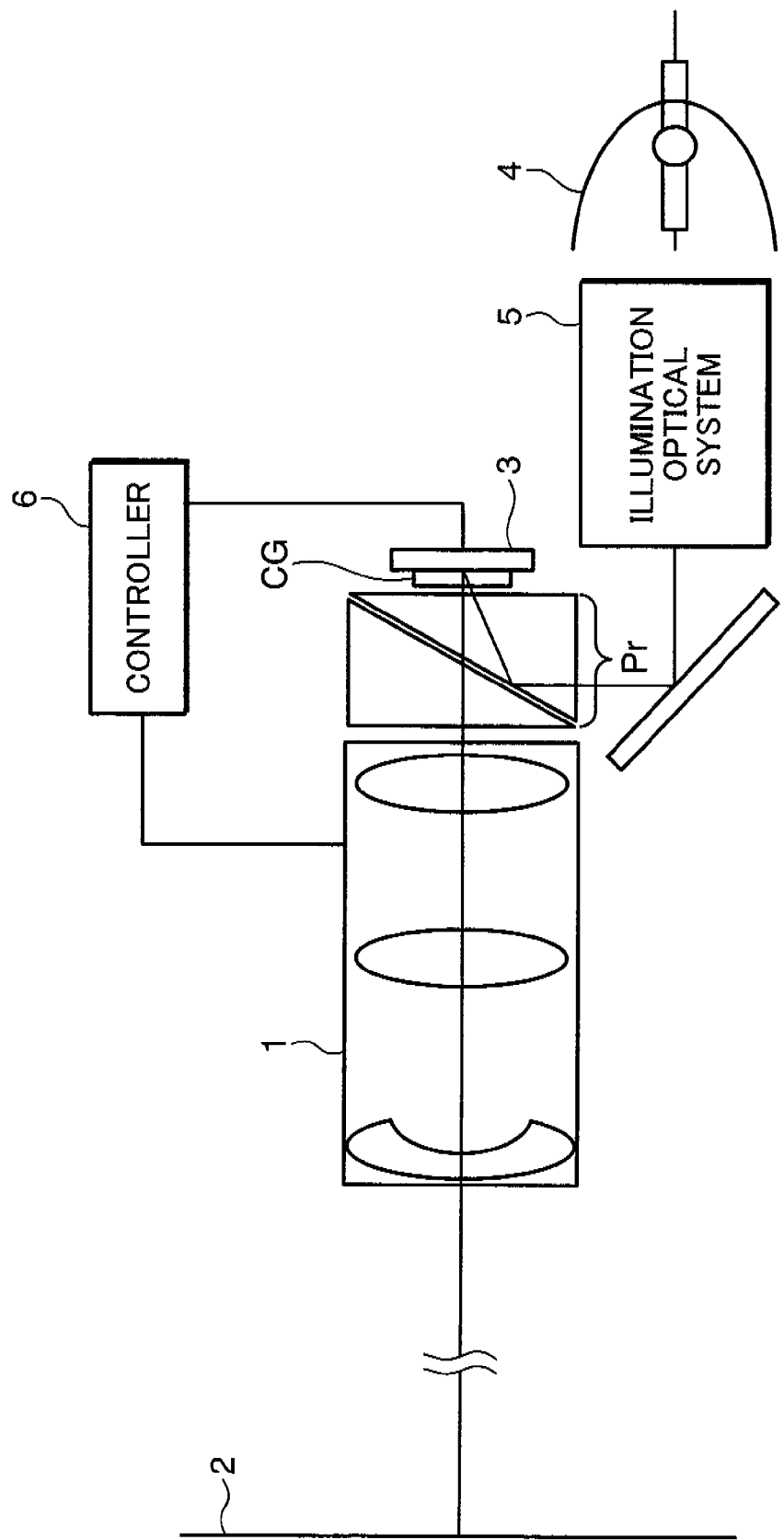
FIG. 24 is a diagram showing the entire arrangement of a projector embodying the invention.

In this section, described is an example, wherein a projection lens in accordance with the first embodiment of the invention is applied to a projector. FIG. 24 is a diagram showing the entire arrangement of a projector in accordance with the first embodiment. FIG. 1 is a lens arrangement diagram of a projection lens in accordance with the first embodiment.
FIG. 2 is an optical path diagram of the projection lens at a wide-angle end. FIG. 3 is an optical path diagram of the projection lens in a middle focal length position between the wide-angle end and a telephoto end. FIG. 4 is an optical path diagram of the projection lens at the telephoto end.
As shown in FIG. 24, the projector includes a screen 2, an image generator 3 for generating an image by modulating light, a projection lens 1 for projecting an image onto the screen 2, a light source 4, an illumination optical system 5 for guiding light from the light source 4 to the image generator 3, a prism Pr constituted of e.g. a TIR prism for separating illumination light and projection light, and a controller 6 for controlling overall operations of the projector. A cover glass CG is mounted on a front surface of the image generator 3.

As shown in FIG. 1, the projection lens 1 includes first through fifth lens groups Gr1 through Gr5 disposed in this order from the side of the screen 2 (enlargement side or light exit side); and the prism Pr disposed on the side of the image generator 3 (reduction side or light incident side) with respect to the fifth lens group Gr5.

The first lens group Gr1 has a negative power, the second lens group Gr2 has a positive power, the third lens group Gr3 has a positive power, the fourth lens group Gr4 has a negative power, and the fifth lens group Gr5 has a positive power. The second through the fourth lens groups Gr2 through Gr4 serve as movable lens groups. In this embodiment, actuators (not shown) for moving the second through the fourth lens groups Gr2 through Gr4 along an optical axis toward the enlargement side or the reduction side are connected to the second through the fourth lens groups Gr2 through Gr4, respectively. The controller 6 is connected to the actuators to control movement of the second through the fourth lens groups Gr2 through Gr4.

In this embodiment, the third lens group Gr3 serves as a movable lens group having a maximum moving amount, as compared with the second lens group Gr2 and the fourth lens group Gr4. The first lens group Gr1 is constituted of lens elements L1 through L4 in this order from the enlargement side. The second lens group Gr2 is constituted of lens elements L5 and L6 in this order from the enlargement side. The third lens group Gr3 is constituted of lens elements L7 through L9 in this order from the enlargement side. The fourth lens group Gr4 is constituted of lens elements L10 and L11 in this order from the enlargement side. The fifth lens group Gr5 is constituted of lens elements L12 through L17 in this order from the enlargement side, and a diaphragm S1 disposed on the enlargement side with respect to the lens element L12.

The third lens group Gr3 has at least one positive lens element having a positive power. In the example of FIG. 1, the lens element L8 and the lens element L9 correspond to positive lens elements.

The third lens group Gr3 as a movable lens group having a maximum moving amount is moved toward the diaphragm S1 in zooming from the telephoto end to the wide-angle end. In this embodiment, as shown in FIG. 4, at the telephoto end, the third lens group Gr3 is moved to a position closest to the enlargement side, and as shown in FIG. 2, at the wide-angle end, the third lens group Gr3 is moved to a position closest to the reduction side.

The third lens group Gr3, and the lens elements L8 and L9 satisfy the following conditional expressions (1) through (3).

$$Pg,F+0.00181Vd>0.652 \quad (1)$$

$$0.5<Lr/L<0.8 \quad (2)$$

$$1.2<Lsf/Lsr<5 \quad (3)$$

where
Pg, F: a partial dispersion ratio of a lens glass material of the lens element L8, L9,
Vd: the Abbe number of the lens glass material of the lens element L8, L9,
Lr: a distance between the apex of a reduction-side lens surface in the third lens group Gr3, and the apex of a reduction-side lens surface in all the lens groups, in the case where the third lens group Gr3 is moved to the position closest to the enlargement side in zooming (see FIG. 4),
L: a lens length of all the lens groups, in the case where the third lens group Gr3 is moved to the position closest to the enlargement side in zooming (see FIG. 4),
Lsf: a distance between the apex of the reduction-side lens surface in the third lens group Gr3, and a surface of the diaphragm, in the case where the third lens group Gr3 is moved to the position closest to the enlargement side in zooming (see FIG. 4), and
Lsr: a distance between the apex of the reduction-side lens surface in the third lens group Gr3, and the surface of the diaphragm, in the case where the third lens group Gr3 is moved to the position closest to the reduction side in zooming (see FIG. 2).

Preferably, the projection lens 1 may satisfy the conditional expression (1)', in place of the conditional expression (1).

$$Pg,F+0.00118Vd>0.655 \quad (1)'$$

As shown in the optical path diagrams of FIG. 2 and FIG. 4, in the third lens group Gr3, the light flux passing position can be set high at the telephoto end, and the light flux passing position can be set low at the wide-angle end by satisfying the conditional expression (3).

As shown in FIG. 2, at the wide-angle end, the light flux passing position of off-axis light in the third lens group Gr3 is close to the light flux passing position of on-axis light. As a result, at the wide-angle end, the effect of refracting the off-axis light in the third lens group Gr3 is substantially the same as the effect of refracting the on-axis light. Accordingly, at the wide-angle end, a difference in lateral chromatic aberration between the off-axis light, and light near the optical axis in the third lens group Gr3 is small, and lateral chromatic aberration generated in the third lens group Gr3 is small.

Generally, as shown in FIG. 2 and FIG. 4, a projection lens is constructed in such a manner that the light flux width of off-axis light passing through the third lens group Gr3 is increased at the telephoto end and decreased at the wide-angle end in order to secure a fast lens system in zooming as much as possible. Thereby, the effect of refracting off-axis light at the telephoto end is gradually increased in the off-axis direction, and accordingly, the effect of correcting lateral chromatic aberration can be gradually increased in the off-axis direction. Thus, an effect of correcting lateral chromatic aberration can be sufficiently obtained even at the intermediate imaging position between the on-axis position and the outermost off-axis position.

In the above arrangement, fabricating the lens elements L8 and L9 having a positive power in the third lens group Gr3 into a lens element having a characteristic as represented by the conditional expression (1) enables to suppress generation and variation of lateral chromatic aberration from the wide-angle end to the telephoto end. The conditional expression (1) indicates that the lens glass material has Lang characteristic.

The projection lens 1 in this embodiment satisfies the conditional expression (4).

$$ft/fw>1.3 \quad (4)$$

where ft is a focal length of all the lens groups at the telephoto end, and fw is a focal length of all the lens groups at the wide-angle end.

In the case where the conditional expression (4) is satisfied, in the conventional arrangement, a difference in lateral chromatic aberration between the telephoto end and the wide-angle end is likely to increase. However, the lateral chromatic aberration difference can be suppressed by satisfying the conditional expressions (1) through (3).

Thereby, the zoom ratio can be increased, and usage environment of the projection lens 1 can be made versatile.

The projection lens 1 in this embodiment satisfies the conditional expression (5).

$$|exp/fw|>40 \quad (5)$$

where exp is a paraxial exit pupil position relative to the reduction-side imaging position (i.e. the image generator 3), and fw is a focal length of all the lens groups at the wide-angle end.

Thereby, telecentricity can be secured. If the left-side value of the conditional expression (5) is under the lower limit, particularly, the efficiency in combining colors by a dichroic prism or extracting illumination light by a TIR prism may be lowered, because the angle of off-axis light is unduly increased.

The projection lens 1 in this embodiment satisfies the conditional expression (6).

$$Lsr/Lw<0.3 \qquad (6)$$

where Lsr is a distance between the diaphragm S1, and the apex of a reduction-side lens surface in the third lens group Gr3, in the case where the third lens group Gr3 is moved to the position closest to the reduction side in zooming (see FIG. 2), and Lw is a lens length of all the lens groups, in the case where the third lens group Gr3 is moved to the position closest to the reduction side in zooming (see FIG. 2).

Thereby, at the wide-angle end, the third lens group Gr3 is moved to a position close to the diaphragm S1, and the effect of correcting lateral chromatic aberration at the telephoto end can be increased, without changing the lateral chromatic aberration at the wide-angle end.

The projection lens 1 in this embodiment is constructed in such a manner that each of the first lens group Gr1 and the second lens group Gr2 disposed at a position closer to the enlargement side with respect to the third lens group Gr3 includes at least one negative lens element, and the negative lens elements satisfy the conditional expression (1). In this embodiment, negative lens elements satisfying the conditional expression (1) are the lens element L2 and the lens element L5. Preferably, at least one negative lens element to be provided in each of the first lens group Gr1 and the second lens group Gr2 may satisfy the conditional expression (1)', in place of the conditional expression (1).

Thereby, lateral chromatic aberration at the wide-angle end can be reduced. Since lateral chromatic aberration at the telephoto end is corrected by the positive lens elements in the third lens group Gr3, and lateral chromatic aberration at the wide-angle end is corrected by the negative lens elements in the first lens group Gr1 and the second lens group Gr2, lateral chromatic aberration in the entire zoom range can be corrected. Further, in this embodiment, the number of the lens elements L1 through L17 constituting all the lens groups is seventeen. Thus, the lens construction is simplified.

The number of the lens elements constituting each of the first through the fifth lens groups Gr1 through Gr5 is not limited to the one shown in FIG. 1, but may be the number other than the one shown in FIG. 1.

FIGS. 5A and 5B are diagrams schematically showing effects of correcting lateral chromatic aberration of the projection lens 1 in this embodiment. FIGS. 6A and 6B are diagrams schematically showing effects of correcting lateral chromatic aberration of a projection lens as a comparative example. The projection lens 1 in this embodiment is constructed in such a manner that a movable lens group (third lens group Gr3) having a maximum moving amount is moved toward the diaphragm in zooming from the telephoto end to the wide-angle end. On the other hand, the projection lens as a comparative example is constructed in such a manner that a movable lens group having a maximum moving amount is moved away from the diaphragm in zooming from the telephoto end to the wide-angle end. In other words, in the comparative example, the projection lens is constructed to reduce lateral chromatic aberration at the telephoto end, and correct lateral chromatic aberration at the wide-angle end by the movable lens group having the maximum moving amount.

FIGS. 5A and 6A show effects of correcting lateral chromatic aberration at the telephoto end, and FIGS. 5B and 6B show effects of correcting lateral chromatic aberration at the wide-angle end, respectively.

In FIGS. 5A and 5B, and FIGS. 6A and 6B, the vertical axis indicates a magnitude of lateral chromatic aberration, and the horizontal axis indicates a distance from the optical axis of a projection lens.

In this embodiment, lateral chromatic aberration at the telephoto end is corrected by the third lens group Gr3 satisfying the conditional expressions (1) and (3), but lateral chromatic aberration at the wide-angle end is not corrected. However, in this embodiment, lateral chromatic aberration at the wide-angle end is set small by fabricating the negative lens elements (lens elements L2 and L5) in the first lens group Gr1 and the second lens group Gr2 into a negative lens element satisfying the conditional expression (1), in other words, a lens element satisfying Lang characteristic. Accordingly, as is obvious from FIGS. 5A and 5B, lateral chromatic aberration at both of the wide-angle end and the telephoto end is satisfactorily corrected.

On the other hand, in the case of FIGS. 6A and 6B, the projection lens is constructed in such a manner that lateral chromatic aberration at the telephoto end is not generated, and lateral chromatic aberration at the wide-angle end is corrected by the third lens group Gr3. In the case of a projection lens, lens elements having substantially the same F-number are required to be arranged at the telephoto end and the wide-angle end. Accordingly, the light flux width at the wide-angle end is reduced, as compared with the light flux width at the telephoto end. If a light flux having a small light flux width is incident on a periphery of a lens element, the light flux is subjected to strong refraction, as compared with a light flux having a large light flux width.

Accordingly, as is obvious from FIG. 6B, the effect of correcting lateral chromatic aberration is excessively imposed on the periphery of a lens element, and lateral chromatic aberration is not satisfactorily corrected.

Example 1

In this section, Example 1 of the projection lens 1 in accordance with the first embodiment is described. Construction data of lens elements in Example 1 is as follows. CR indicates a curvature radius of a lens surface of each lens element. T indicates a distance (on-axis distance between lens surfaces) between lens surfaces on the optical axis in an infinite focus position. Nd indicates a refractive index of each lens element with respect to d-line. Vd indicates the Abbe number of each lens element with respect to d-line. The lens surface attached with the symbol ri (i=1, 2, 3, ...) indicates the i-th lens surface from the enlargement side.

| | unit: mm | | | |
|---|---|---|---|---|
| lens surface number | CR | T | Nd | Vd |
| 1 | 159.120 | 10.101 | 1.5168 | 64.2 |
| 2 | 1150.457 | 0.300 | | |
| 3 | 129.889 | 5.000 | 1.48749 | 70.44 |
| 4 | 54.181 | 13.898 | | |
| 5 | 408.230 | 4.099 | 1.62299 | 58.12 |
| 6 | 60.318 | 13.793 | | |

-continued unit: mm

| | | | | |
|---|---|---|---|---|
| 7 | −388.564 | 3.724 | 1.60311 | 60.69 |
| 8 | 85.750 | variable | | |
| 9 | −163.277 | 4.000 | 1.62004 | 36.29 |
| 10 | 203.028 | 2.172 | | |
| 11 | 167.910 | 13.235 | 1.713 | 53.94 |
| 12 | −84.834 | variable | | |
| 13 | −74.125 | 3.752 | 1.53172 | 48.84 |
| 14 | 210.004 | 2.288 | | |
| 15 | 254.435 | 11.317 | 1.48749 | 70.44 |
| 16 | −71.783 | 0.353 | | |
| 17 | 145.364 | 6.943 | 1.497 | 81.61 |
| 18 | −368.970 | 70.864 | 39.285 | 3.183 |
| 19 | −268.508 | 2.500 | 1.497 | 81.61 |
| 20 | 61.678 | 3.864 | | |
| 21 | 74.377 | 5.467 | 1.6727 | 32.17 |
| 22 | 463.777 | variable | | |
| 23 (diaphragm) | infinite | 65.254 | | |
| 24 | 2648.586 | 2.674 | 1.6968 | 55.46 |
| 25 | 110.620 | 1.620 | | |
| 26 | 75.026 | 8.886 | 1.497 | 81.61 |
| 27 | −118.044 | 15.000 | | |
| 28 | 101.694 | 9.074 | 1.497 | 81.61 |
| 29 | −104.836 | 2.395 | | |
| 30 | −88.294 | 3.000 | 1.8061 | 40.72 |
| 31 | 63.381 | 4.295 | | |
| 32 | 85.519 | 7.998 | 1.497 | 81.61 |
| 33 | −213.247 | 0.800 | | |
| 34 | 73.913 | 8.683 | 1.497 | 81.61 |
| 35 | −209.000 | 15.300 | | |
| 36 | infinite | 85.000 | 1.5168 | 64.2 |
| 37 | infinite | 3.000 | | |
| 38 | infinite | 3.000 | 1.48749 | 70.44 |
| 39 | infinite | 2.000 | | |

Various data on zooming

| | telephoto end | middle | wide-angle end |
|---|---|---|---|
| focal length | 42.51 | 36.80 | 31.10 |
| F-number | 2.50 | 2.50 | 2.50 |
| T8 | 27.844 | 26.379 | 25.687 |
| T12 | 42.552 | 72.356 | 105.818 |
| T22 | 3.455 | 6.695 | 10.026 |

TABLE 1

| | | | |
|---|---|---|---|
| Pg, F | 0.5305 (L2, L8) | 0.5387 (L9) | 0.5871 (L5) |
| Vd | 70.44 (L2, L8) | 81.61 (L9) | 36.29 (L5) |
| CONDITIONAL EXPRESSION (1) | 0.658 (L2, L8) | 0.686 (L9) | 0.653 (L5) |
| Lr | 215.82 | | |
| L | 381.20 | | |
| CONDITIONAL EXPRESSION (2) | 0.566 | | |
| Lsf | 86.15 | | |
| Lsr | 25.04 | | |
| CONDITIONAL EXPRESSION (3) | 3.44 | | |
| ft | 42.50 | | |
| fw | 31.09 | | |
| CONDITIONAL EXPRESSION (4) | 1.36 | | |
| exp | 38902 (TELE) | 38902 (WIDE) | |
| CONDITIONAL EXPRESSION (5) | 1250 (TELE) | 1250 (WIDE) | |
| Lw | 381.20 | | |
| CONDITIONAL EXPRESSION (6) | 0.066 | | |

Table 1 shows values of the conditional expressions (1) through (6) concerning the projection lens 1 in accordance with the first embodiment. Concerning the exit pupil position exp, a positive value indicates that the exit pupil position is on the enlargement side of a reduction-side image plane, and a negative value indicates that the exit pupil position is on the side opposite to the enlargement side of a reduction-side image plane.

Figure 9A:
FIGS. 9A through 9D are aberration diagrams of Example 1 of the projection lens in accordance with the first embodiment.
Figure 9B:
Figure 9C:
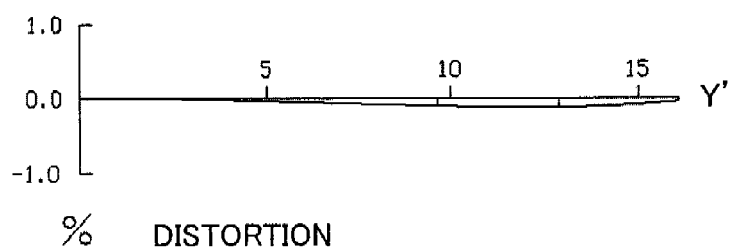
Figure 9D:
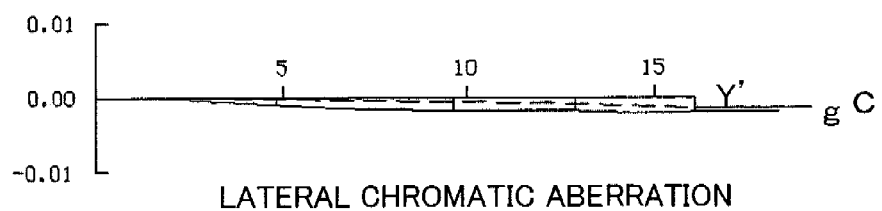

FIGS. 7A through 9D are aberration diagrams of the projection lens 1 as Example 1 having the above lens arrangement and construction data. FIGS. 7A through 7D are aberration diagrams at the wide-angle end. FIGS. 8A through 8D are aberration diagrams in the middle focal length position. FIGS. 9A through 9D are aberration diagrams at the telephoto end. Referring to FIGS. 7A through 9D, FIGS. 7A, 8A, and 9A show spherical aberrations and sine conditions; FIGS. 7B, 8B, and 9B show astigmatisms; FIGS. 7C, 8C, and 9C show distortion aberrations, and FIGS. 7D, 8D, and 9D show lateral chromatic aberrations. Each of the aberration diagrams show aberration at the reduction side.

In the spherical aberration diagrams, the solid line "d", the one-dotted-chain line "g", and the two-dotted chain line "C" respectively represent spherical aberration amounts (unit: mm) with respect to d-line, g-line, and C-line; and the broken line "sc" represents the amount (unit: mm) of dissatisfaction with respect to the sine condition. In the astigmatism diagrams, the lines "d", "g", and "C" in DT respectively represent astigmatism (unit: mm) on a meridional plane with respect to the corresponding emission lines; and the lines "d", "g", and "C" in DS respectively represent astigmatism (unit: mm) on a sagittal plane with respect to the corresponding emission lines. In the distortion aberration diagrams, the solid line represents a distortion (unit: %) with respect to d-line. In the lateral chromatic aberration diagrams, the line "g" (solid line) and the line "C" (broken line) respectively represent lateral chromatic aberration (unit: mm) with respect to d-line.

Second Embodiment

Figure 10:
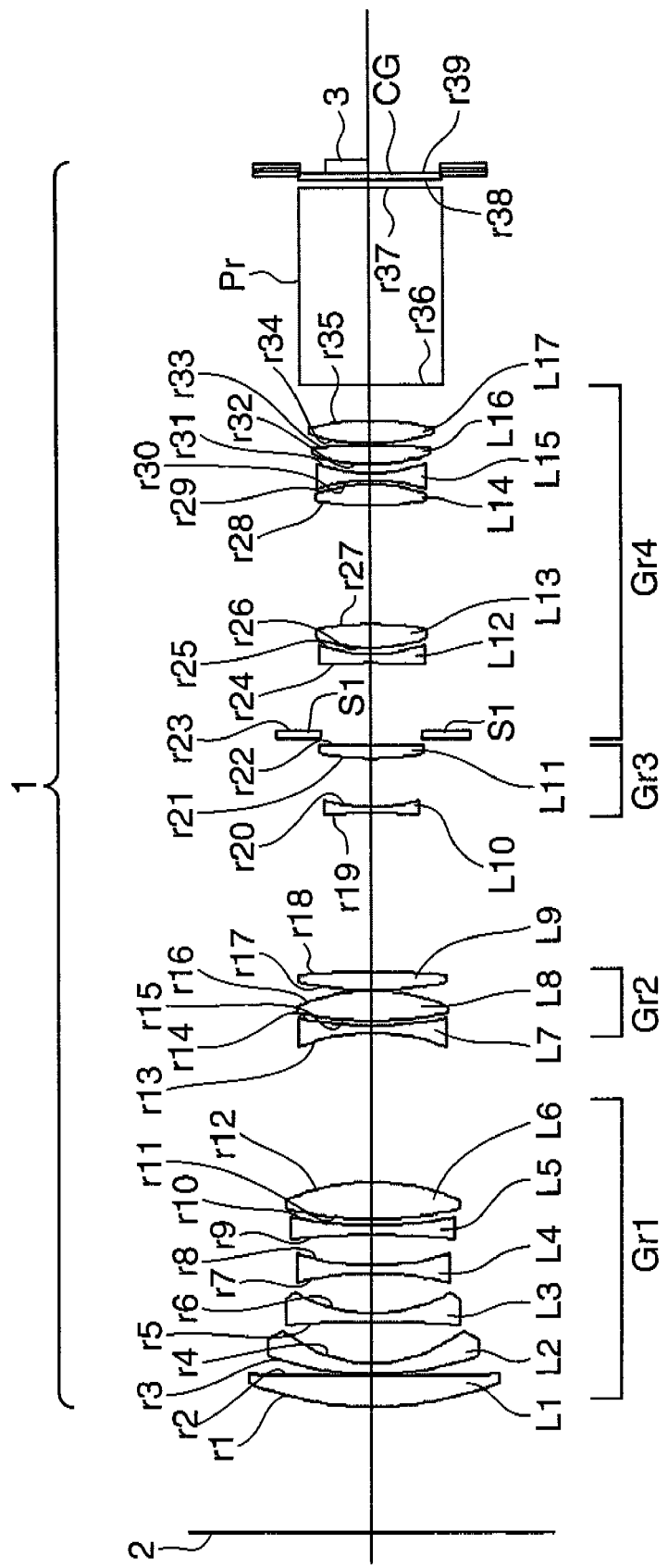
FIG. 10 is a lens arrangement diagram of a projection lens in accordance with the second embodiment of the invention.

FIG. 10 is a lens arrangement diagram of a projection lens 1 in accordance with the second embodiment of the invention. Description on elements in the second embodiment substantially identical or equivalent to those in the first embodiment is omitted herein. As shown in FIG. 10, the projection lens 1 for use in a projector is constituted of a first lens group Gr1 having a negative power, a second lens group Gr2 having a positive power, a third lens group Gr3 having a negative power, and a fourth lens group Gr4 having a positive power. The second and the third lens groups Gr2 and Gr3 serve as movable lens groups, and the second lens group Gr2 serves as a movable lens group having a maximum moving amount.

The first lens group Gr1 is constituted of lens elements L1 through L6. The second lens group Gr2 is constituted of lens elements L7 through L9. The third lens group Gr3 is constituted of lens elements L10 and L11. The fourth lens group Gr4 is constituted of lens elements L12 through L17, and a diaphragm S1.

Figure 11:
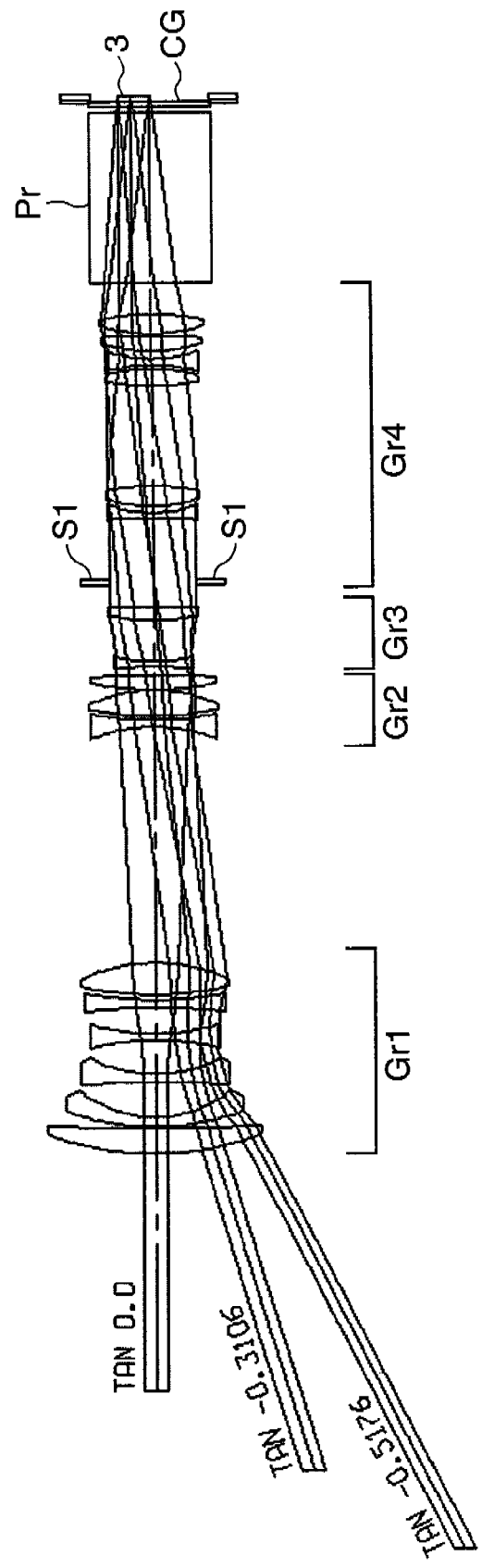
FIG. 11 is an optical path diagram of the projection lens in the second embodiment at a wide-angle end.
Figure 12:
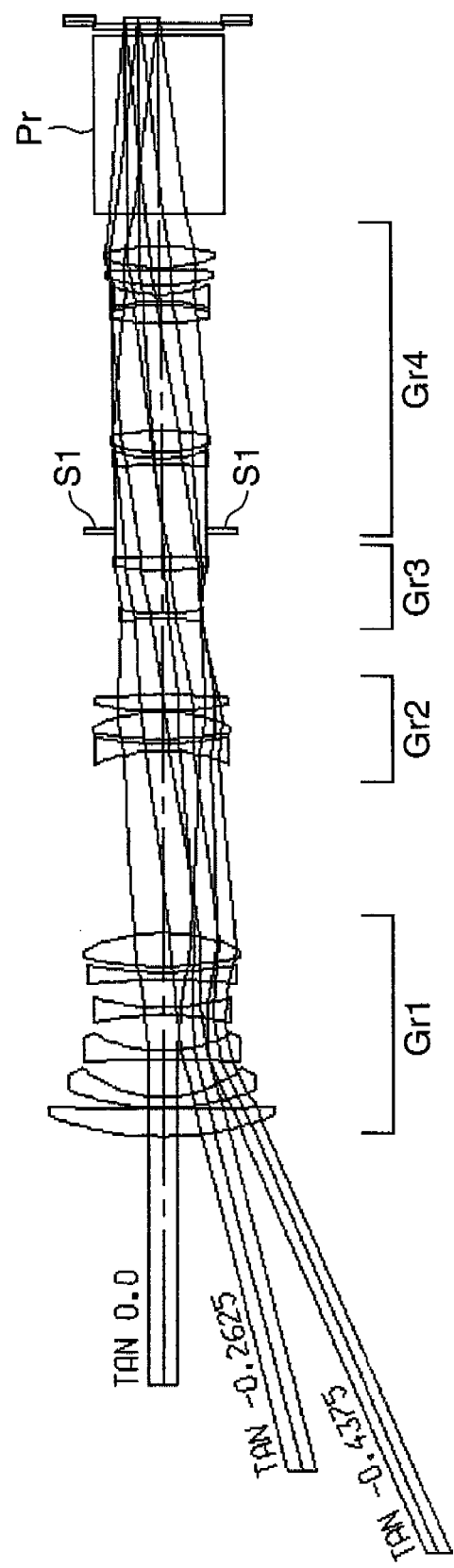
FIG. 12 is an optical path diagram of the projection lens in the second embodiment in a middle focal length position.
Figure 13:
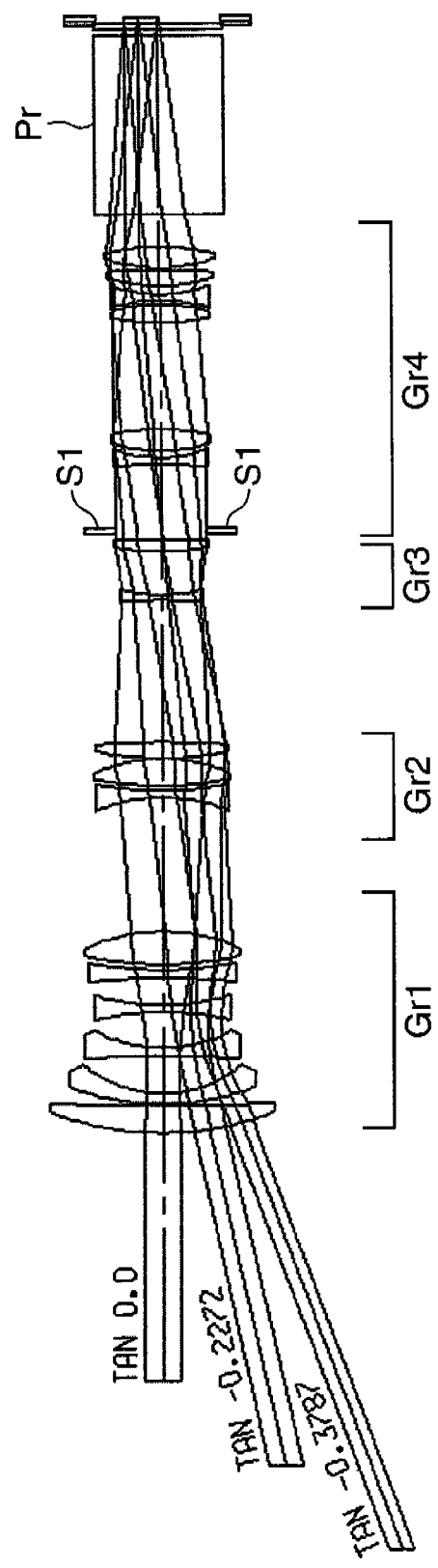
FIG. 13 is an optical path diagram of the projection lens in the second embodiment at a telephoto end.
Figure 14A:
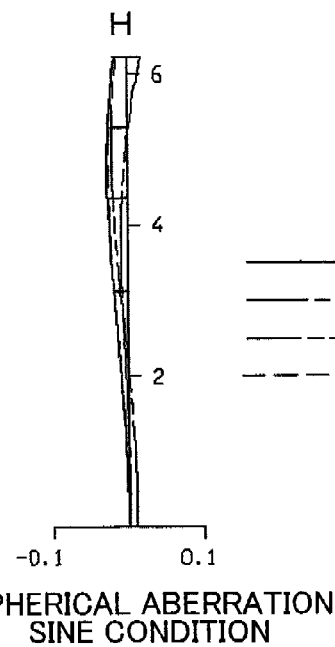
FIGS. 14A through 14D are aberration diagrams of Example 2 of the projection lens in accordance with the second embodiment.
Figure 14B:
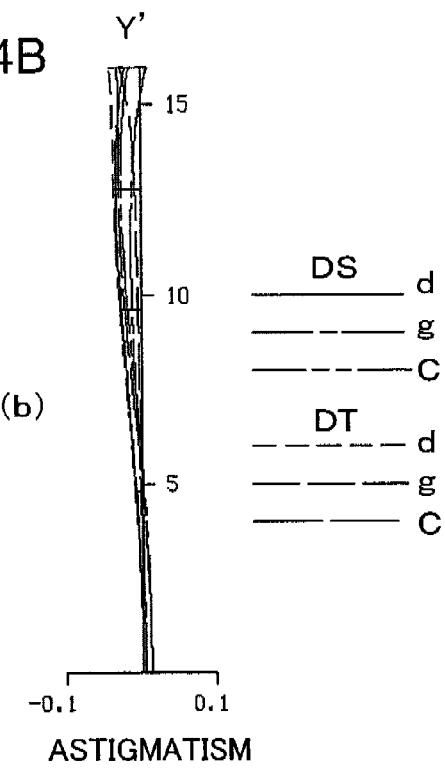
Figure 14C:
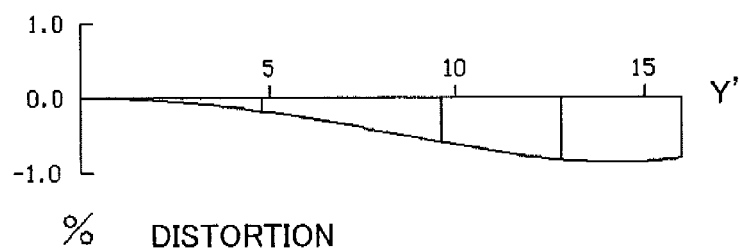
Figure 14D:
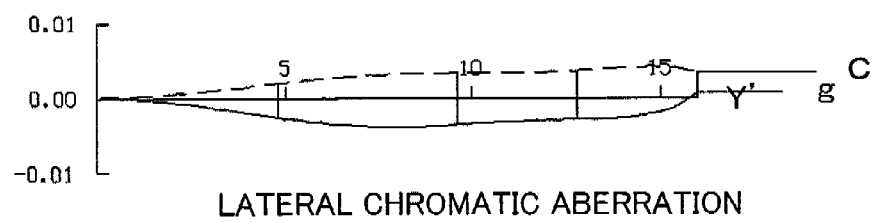
Figure 15A:
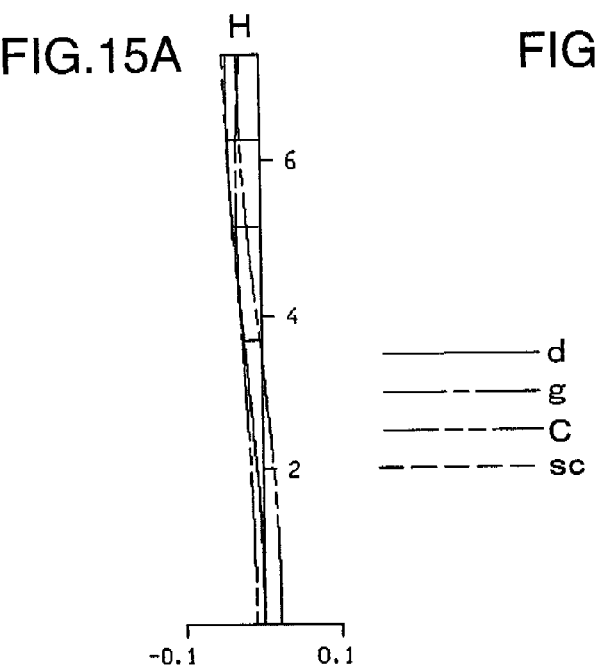
FIGS. 15A through 15D are aberration diagrams of Example 2 of the projection lens in accordance with the second embodiment.
Figure 15B:
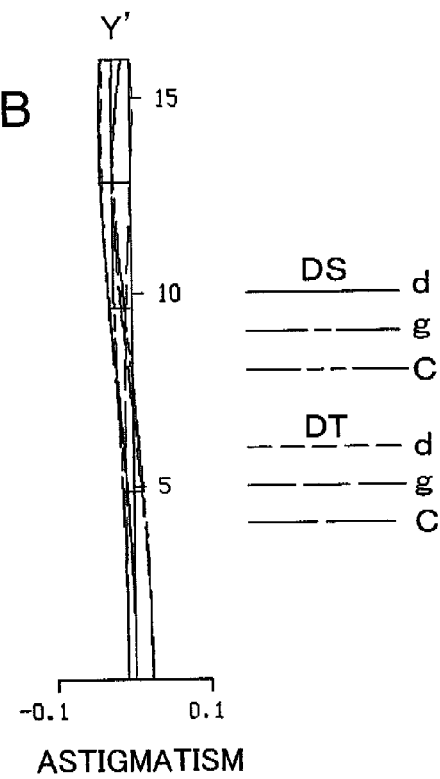
Figure 15C:
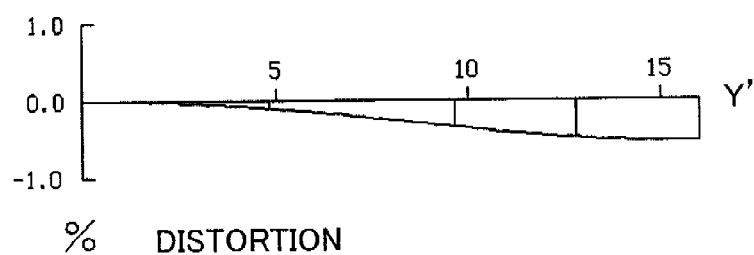
Figure 15D:
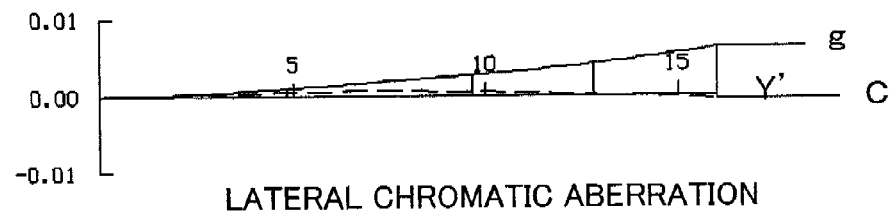

FIG. 11 is an optical path diagram of the projection lens 1 at a wide-angle end. FIG. 12 is an optical path diagram of the projection lens 1 in a middle focal length position. FIG. 13 is an optical path diagram of the projection lens 1 at a telephoto end.

As shown in the optical path diagrams of FIG. 11 and FIG. 13, in the second lens group Gr2, the light flux passing position can be set high at the telephoto end, and the light flux passing position can be set low at the wide-angle end by satisfying the conditional expression (3).

As shown in FIG. 11, at the wide-angle end, the light flux passing position of off-axis light in the second lens group Gr2 is close to the light flux passing position of on-axis light. As a result, at the wide-angle end, the effect of refracting off-axis light in the second lens group Gr2 is substantially the same as the effect of refracting on-axis light. Accordingly, at the wide-angle end, a difference in lateral chromatic aberration between the off-axis light, and light near the optical axis in the second lens group Gr2 is small, and lateral chromatic aberration generated in the second lens group Gr2 is small.

Generally, as shown in FIG. 11 and FIG. 13, a projection lens is constructed in such a manner that the light flux width of off-axis light passing through the second lens group Gr2 is increased at the telephoto end and decreased at the wide-angle end in order to secure a fast lens system in zooming as much as possible. Thereby, the effect of refracting off-axis light at the telephoto end is gradually increased in the off-axis direction, and accordingly, the effect of correcting lateral chromatic aberration can be gradually increased in the off-axis direction. Thus, an effect of correcting lateral chromatic aberration can be sufficiently obtained even at the intermediate imaging position between the on-axis position and the outermost off-axis position.

In the above arrangement, fabricating the lens elements L8 and L9 having a positive power in the second lens group Gr2 into a lens element having a characteristic as represented by the conditional expression (1) enables to suppress generation and variation of lateral chromatic aberration from the wide-angle end to the telephoto end.

In this embodiment, the second positive lens element and the third positive lens element (lens elements L8 and L9) in the second lens group Gr2 from the enlargement side have Lang characteristic; and the fourth negative lens element and the fifth negative lens element (lens elements L4 and L5) in the first lens group Gr1 from the enlargement side have Lang characteristic. This is advantageous in effectively correcting lateral chromatic aberration at the wide-angle end. Also, similarly to the first embodiment, the projection lens 1 in accordance with the second embodiment satisfies the conditional expressions (1) through (6). Thereby, the effect of correcting lateral chromatic aberration at the telephoto end can be increased, without changing lateral chromatic aberration at the wide-angle end. Further, in this embodiment, the number of the lens elements L1 through L17 constituting all the lens groups is seventeen. Thus, the lens construction is simplified.

Example 2

In this section, Example 2 of the projection lens 1 in accordance with the second embodiment is described. Construction data of lens elements in Example 2 is described as follows.

| lens surface number | CR | T | Nd | Vd |
|---|---|---|---|---|
| 1 | 145.914 | 13.688 | 1.5168 | 64.2 |
| 2 | 4111.673 | 0.300 | | |
| 3 | 126.700 | 5.000 | 1.62299 | 58.12 |
| 4 | 59.838 | 17.863 | | |
| 5 | −487.327 | 4.000 | 1.62299 | 58.12 |
| 6 | 69.775 | 16.990 | | |
| 7 | −135.987 | 3.500 | 1.48749 | 70.44 |
| 8 | 110.920 | 13.163 | | |
| 9 | −297.722 | 4.000 | 1.62004 | 36.29 |
| 10 | 182.301 | 2.692 | | |
| 11 | 167.869 | 15.859 | 1.713 | 53.94 |
| 12 | −86.701 | variable | | |
| 13 | −82.787 | 3.500 | 1.53172 | 48.84 |
| 14 | 158.884 | 2.082 | | |
| 15 | 168.714 | 12.878 | 1.48749 | 70.44 |
| 16 | −77.261 | 0.300 | | |
| 17 | 143.584 | 7.702 | 1.497 | 81.61 |
| 18 | −379.331 | variable | | |
| 19 | −196.436 | 2.500 | 1.497 | 81.61 |
| 20 | 75.757 | 20.746 | | |
| 21 | 117.572 | 6.032 | 1.6727 | 32.17 |
| 22 | 34246.575 | variable | | |
| 23 (diaphragm) | infinite | 31.325 | | |
| 24 | −7727.975 | 3.500 | 1.48749 | 70.44 |
| 25 | 59.705 | 3.113 | | |
| 26 | 65.511 | 10.307 | 1.497 | 81.61 |
| 27 | −120.777 | 50.798 | | |
| 28 | 118.670 | 9.002 | 1.497 | 81.61 |
| 29 | −71.036 | 1.607 | | |
| 30 | −76.120 | 3.000 | 1.8061 | 40.72 |
| 31 | 62.865 | 4.142 | | |
| 32 | 83.250 | 7.796 | 1.497 | 81.61 |
| 33 | −260.727 | 0.800 | | |
| 34 | 76.999 | 9.968 | 1.497 | 81.61 |
| 35 | −114.817 | 15.300 | | |
| 36 | infinite | 85.000 | 1.5168 | 64.2 |
| 37 | infinite | 3.000 | | |
| 38 | infinite | 3.000 | 1.48749 | 70.44 |
| 39 | infinite | 2.000 | | |

| Various data on zooming | | | |
|---|---|---|---|
| | telephoto end | middle | wide-angle end |
| focal length | 42.51 | 36.80 | 31.10 |
| F-number | 2.50 | 2.50 | 2.50 |
| T12 | 64.135 | 87.520 | 119.446 |
| T18 | 68.375 | 36.046 | 4.048 |
| T22 | 4.016 | 12.960 | 13.031 |

TABLE 2

| Pg, F | 0.5305 (L4, L8) | 0.5387 (L9) | 0.5871 (L5) |
|---|---|---|---|
| Vd | 70.44 (L4, L8) | 81.61 (L9) | 36.29 (L5) |
| CONDITIONAL EXPRESSION (1) | 0.658 (L4, L8) | 0.686 (L9) | 0.653 (L5) |
| Lr | 237.02 | | |
| L | 424.67 | | |
| CONDITIONAL EXPRESSION (2) | 0.558 | | |
| Lsf | 101.66 | | |
| Lsr | 46.35 | | |
| CONDITIONAL EXPRESSION (3) | 2.19 | | |
| ft | 42.51 | | |
| fw | 31.10 | | |
| CONDITIONAL EXPRESSION (4) | 1.36 | | |
| exp | 7241 (TELE) | 7241 (WIDE) | |
| CONDITIONAL EXPRESSION (5) | 232 (TELE) | 232 (WIDE) | |
| Lw | 424.67 | | |
| CONDITIONAL EXPRESSION (6) | 0.109 | | |

Table 2 shows values of the conditional expressions (1) through (6) concerning the projection lens 1 in accordance with the second embodiment. Concerning the exit pupil position exp, a positive value indicates that the exit pupil position is on the enlargement side of a reduction-side image plane, and a negative value indicates that the exit pupil position is on the side opposite to the enlargement side of a reduction-side image plane.

Figure 16A:
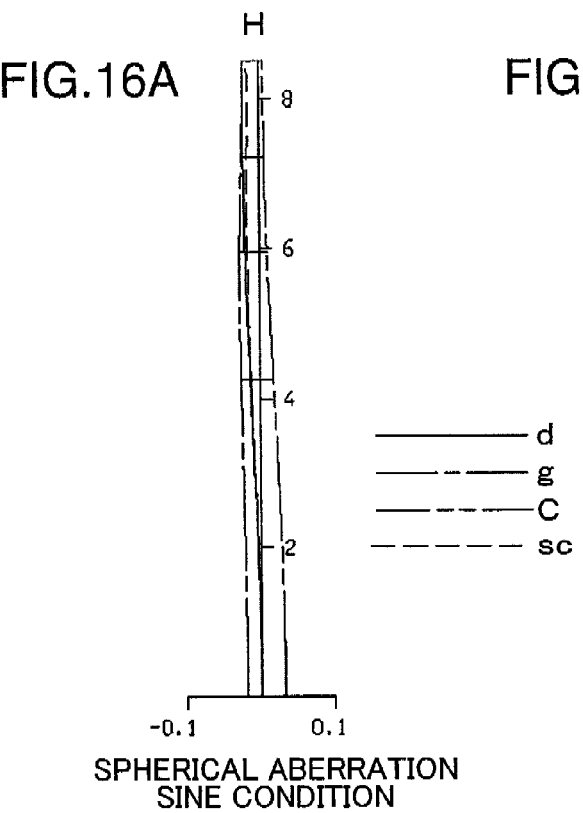
FIGS. 16A through 16D are aberration diagrams of Example 2 of the projection lens in accordance with the second embodiment.
Figure 16B:
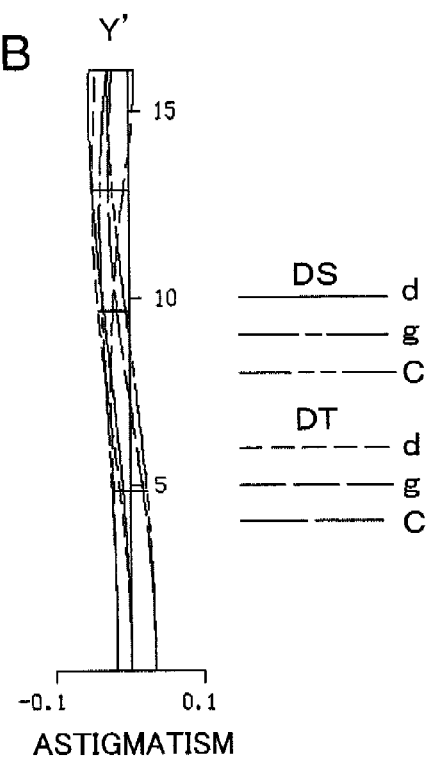
Figure 16C:
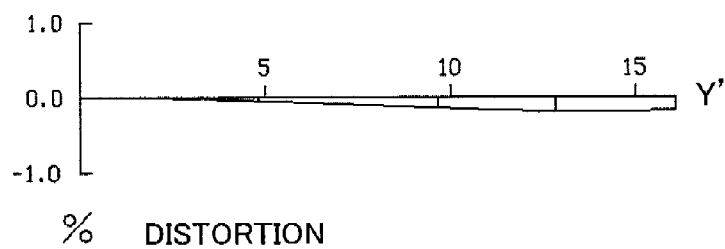
Figure 16D:
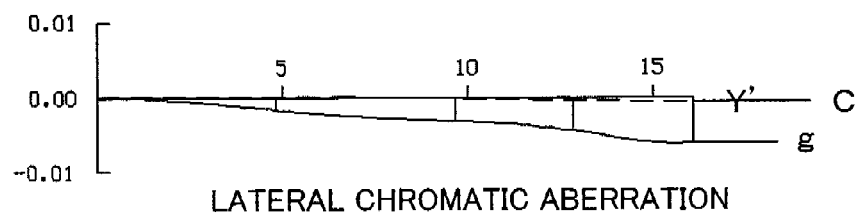

FIGS. 14A through 16D are aberration diagrams of the projection lens 1 as Example 2 having the above lens arrangement and construction data. FIGS. 14A through 14D are aberration diagrams at the wide-angle end. FIGS. 15A through 15D are aberration diagrams in the middle focal length position. FIGS. 16A through 16D are aberration diagrams at the telephoto end. Referring to FIGS. 14A through 16D, FIGS. 14A, 15A, and 16A show spherical aberrations; FIGS. 14B, 15B, and 16B show astigmatisms; FIGS. 14C, 15C, and 16C show distortion aberrations, and FIGS. 14D, 15D, and 16D show lateral chromatic aberrations.

Third Embodiment

Figure 17:
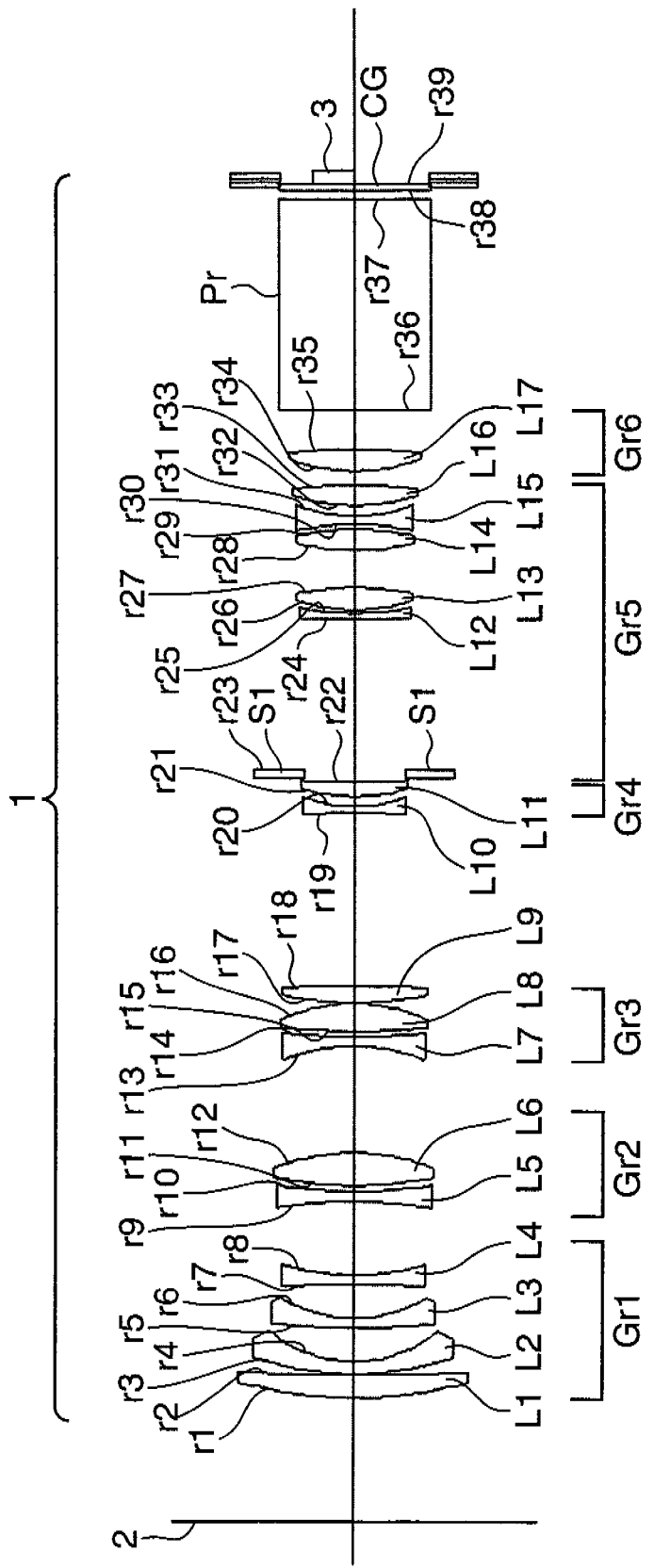
FIG. 17 is a lens arrangement diagram of a projection lens in accordance with the third embodiment of the invention.

FIG. 17 is a lens arrangement diagram of a projection lens 1 in accordance with the third embodiment of the invention. Description on elements in the third embodiment substantially identical or equivalent to those in the first and the second embodiments is omitted herein. As shown in FIG. 17, the projection lens 1 for use in a projector is constituted of a first lens group Gr1 having a negative power, a second lens group Gr2 having a positive power, a third lens group Gr3 having a positive power, a fourth lens group Gr4 having a negative power, a fifth lens group Gr5 having a positive power, and a sixth lens group Gr6 having a positive power. The second through the fifth lens groups Gr2 through Gr5 serve as movable lens groups, and the third lens group Gr3 serves as a movable lens group having a maximum moving amount.

The first lens group Gr1 is constituted of lens elements L1 through L4. The second lens group Gr2 is constituted of lens elements L5 and L6. The third lens group Gr3 is constituted of lens elements L7 through L9. The fourth lens group Gr4 is constituted of lens elements L10 and L11. The fifth lens group Gr5 is constituted of lens elements L12 through L16, and a diaphragm S1. The sixth lens group Gr6 is constituted of a lens element L17.

Figure 18:
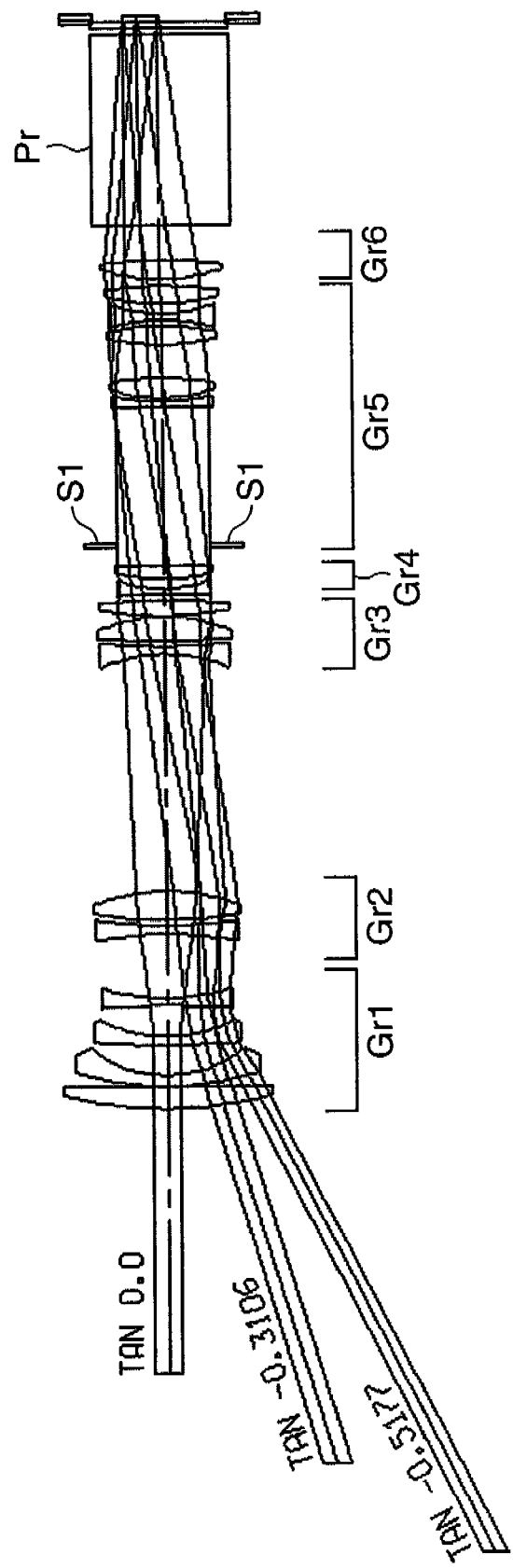
FIG. 18 is an optical path diagram of the projection lens in the third embodiment at a wide-angle end.
Figure 19:
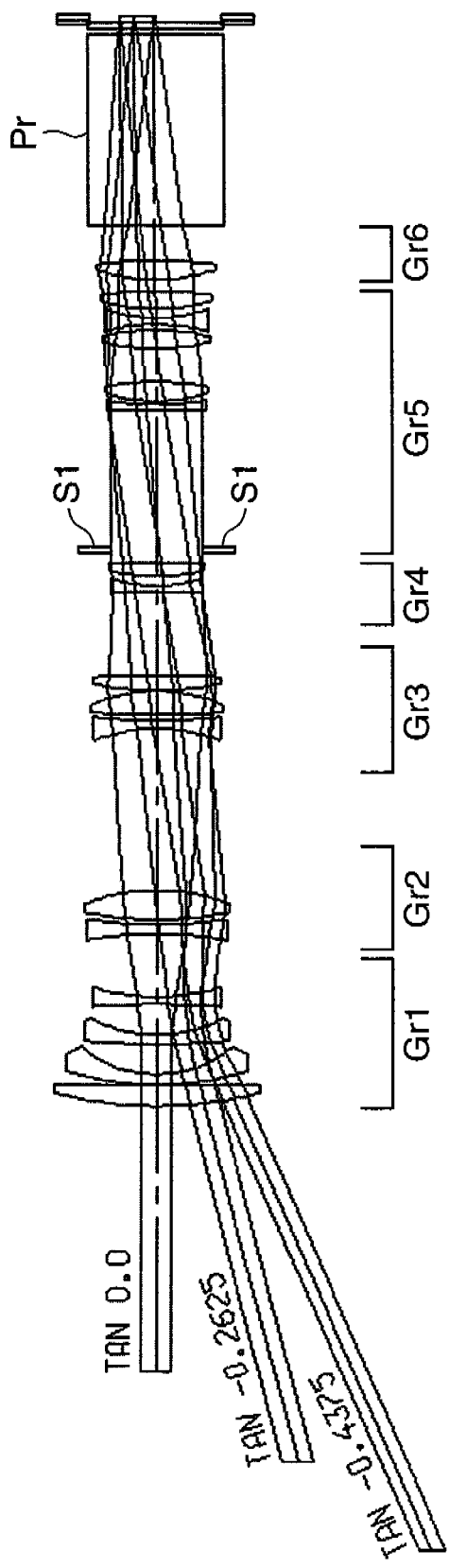
FIG. 19 is an optical path diagram of the projection lens in the third embodiment in a middle focal length position.
Figure 20:
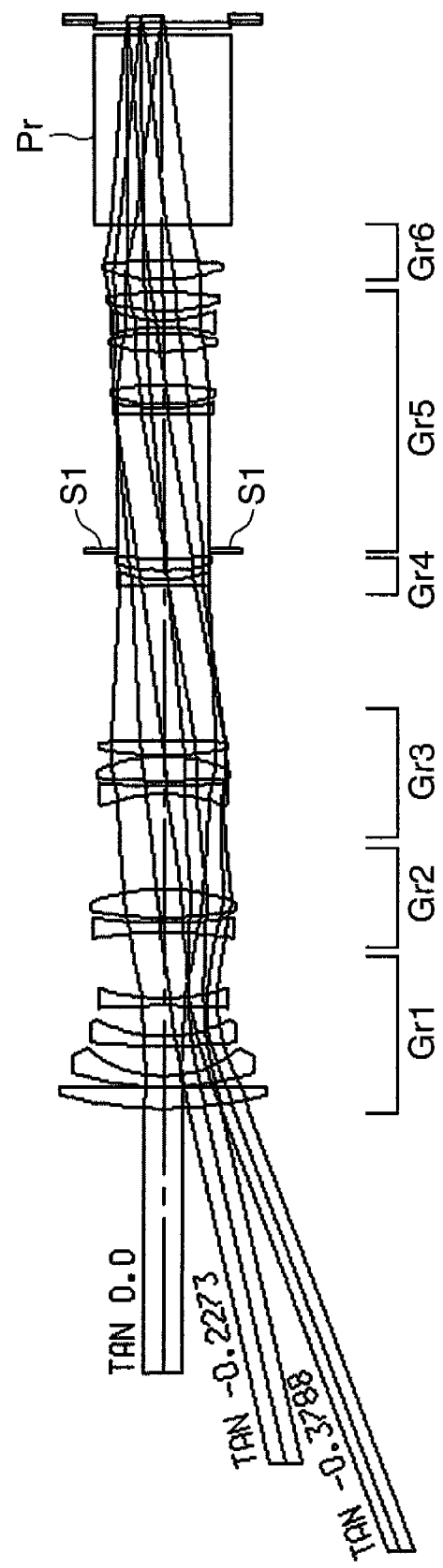
FIG. 20 is an optical path diagram of the projection lens in the third embodiment at a telephoto end.
Figure 21A:
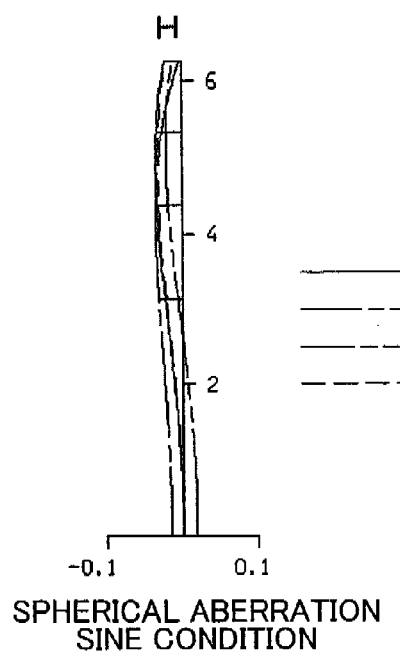
FIGS. 21A through 21D are aberration diagrams of Example 3 of the projection lens in accordance with the third embodiment.
Figure 21B:
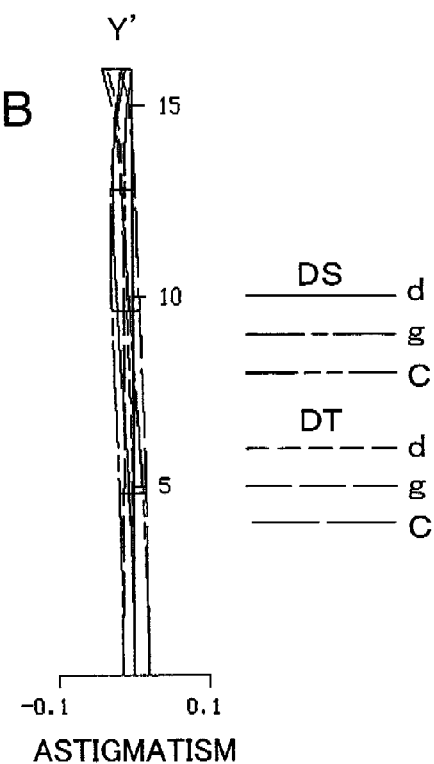
Figure 21C:
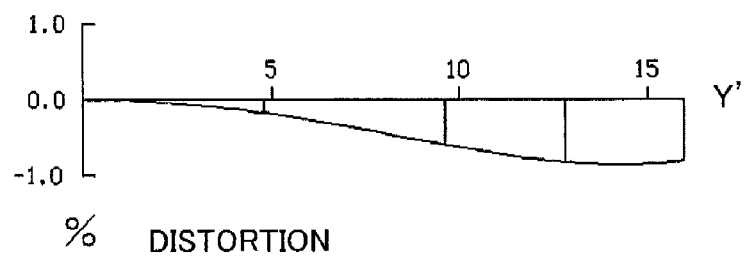
Figure 21D:
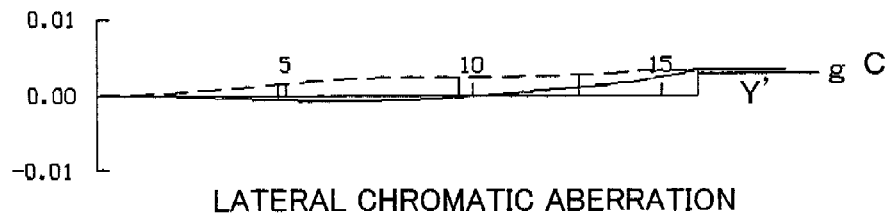
Figure 22A:
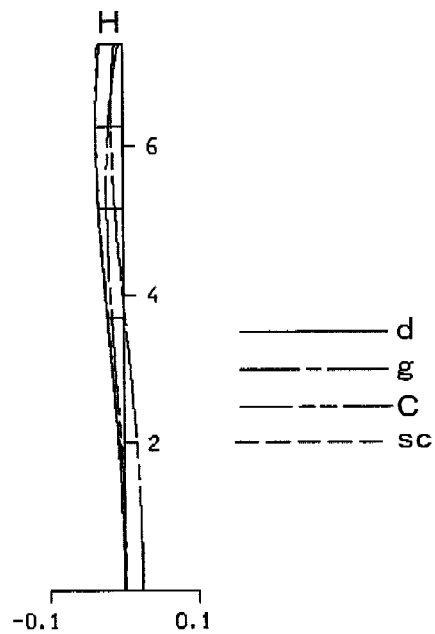
FIGS. 22A through 22D are aberration diagrams of Example 3 of the projection lens in accordance with the third embodiment.
Figure 22B:
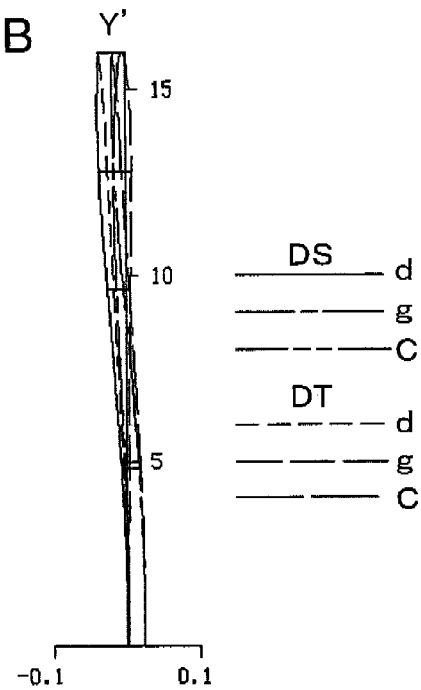
Figure 22C:
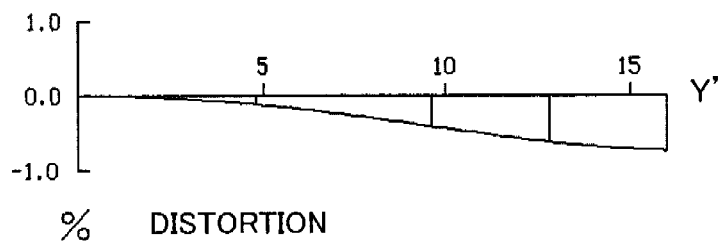
Figure 22D:
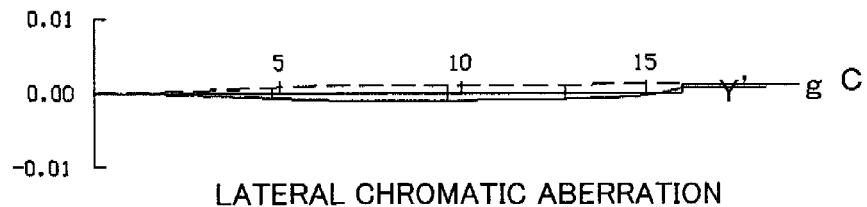

FIG. 18 is an optical path diagram of the projection lens 1 at a wide-angle end. FIG. 19 is an optical path diagram of the projection lens 1 in a middle focal length position. FIG. 20 is an optical path diagram of the projection lens 1 at a telephoto end.

As shown in the optical path diagrams of FIG. 18 and FIG. 20, in the third lens group Gr3, the light flux passing position can be set high at the telephoto end, and the light flux passing position can be set low at the wide-angle end by satisfying the conditional expression (3).

As shown in FIG. 18, at the wide-angle end, the light flux passing position of off-axis light in the third lens group Gr3 is close to the light flux passing position of on-axis light. As a result, at the wide-angle end, the effect of refracting off-axis light in the third lens group Gr3 is substantially the same as the effect of refracting on-axis light. Accordingly, at the wide-angle end, a difference in lateral chromatic aberration between the off-axis light, and light near the optical axis in the third lens group Gr3 is small, and lateral chromatic aberration generated in the third lens group Gr3 is small.

Generally, as shown in FIG. 18 and FIG. 20, a projection lens is constructed in such a manner that the light flux width of off-axis light passing through the third lens group Gr3 is increased at the telephoto end and decreased at the wide-angle end in order to secure a fast lens system in zooming as much as possible. Thereby, the effect of refracting off-axis light at the telephoto end is gradually increased in the off-axis direction, and accordingly, the effect of correcting lateral chromatic aberration can be gradually increased in the off-axis direction. Thus, an effect of correcting lateral chromatic aberration can be sufficiently obtained even at the intermediate imaging position between the on-axis position and the outermost off-axis position.

In the above arrangement, fabricating the lens elements L8 and L9 having a positive power in the third lens group Gr3 into a lens element having a characteristic as represented by the conditional expression (1) enables to suppress generation and variation of lateral chromatic aberration from the wide-angle end to the telephoto end.

In this embodiment, the second positive lens element and the third positive lens element (lens elements L8 and L9) in the third lens group Gr3 from the enlargement side have Lang characteristic; and the second negative lens element (lens elements L2) in the first lens group Gr1 from the enlargement side, and the first negative lens element (lens element L5) in the second lens group Gr2 from the enlargement side have Lang characteristic. This is advantageous in effectively correcting lateral chromatic aberration at the wide-angle end.

Similarly to the first and the second embodiments, the projection lens 1 in accordance with the third embodiment satisfies the conditional expressions (1) through (6).

Thereby, the effect of correcting lateral chromatic aberration at the telephoto end can be increased, without changing lateral chromatic aberration at the wide-angle end. Further, in this embodiment, the number of the lens elements L1 through L17 constituting all the lens groups is seventeen. Thus, the lens construction is simplified.

Example 3

In this section, Example 3 of the projection lens 1 in accordance with the third embodiment is described. Construction data of lens elements in Example 3 is described as follows.

| lens surface number | CR | T | Nd | Vd |
| --- | --- | --- | --- | --- |
| 1 | 174.384 | 9.446 | 1.5168 | 64.2 |
| 2 | 1547.341 | 0.300 | | |
| 3 | 132.570 | 5.000 | 1.48749 | 70.44 |
| 4 | 53.374 | 13.591 | | |
| 5 | 359.021 | 4.000 | 1.62299 | 58.12 |
| 6 | 58.083 | 13.862 | | |
| 7 | −415.638 | 3.500 | 1.60311 | 60.69 |
| 8 | 94.635 | variable | | |
| 9 | −178.335 | 4.000 | 1.62004 | 36.29 |
| 10 | 198.416 | 2.379 | | |
| 11 | 171.982 | 3.076 | 1.713 | 53.94 |
| 12 | −86.487 | variable | | |
| 13 | −72.250 | 3.687 | 1.53172 | 48.84 |
| 14 | 260.421 | 2.329 | | |
| 15 | 340.086 | 11.202 | 1.48749 | 70.44 |
| 16 | −69.818 | 0.300 | | |
| 17 | 138.701 | 6.841 | 1.497 | 81.61 |
| 18 | −464.59 | variable | | |
| 19 | −258.385 | 2.500 | 1.497 | 81.61 |
| 20 | 61.303 | 4.044 | | |
| 21 | 73.952 | 5.559 | 1.6727 | 32.17 |
| 22 | 467.530 | variable | | |
| 23 (diaphragm) | infinite | 62.147 | | |
| 24 | −3327.012 | 2.500 | 1.6968 | 55.46 |
| 25 | 117.293 | 1.380 | | |
| 26 | 72.058 | 8.862 | 1.497 | 81.61 |
| 27 | −119.257 | 15.000 | | |
| 28 | 99.844 | 8.249 | 1.497 | 81.61 |
| 29 | −106.812 | 2.523 | | |
| 30 | −85.559 | 3.000 | 1.8061 | 40.72 |
| 31 | 62.568 | 4.301 | | |
| 32 | 85.163 | 8.099 | 1.497 | 81.61 |
| 33 | −180.309 | variable | | |
| 34 | 74.475 | 8.598 | 1.497 | 81.61 |
| 35 | −226.364 | 15.300 | | |
| 36 | infinite | 85.000 | 1.5168 | 64.2 |
| 37 | infinite | 3.000 | | |
| 38 | infinite | 3.000 | 1.48749 | 70.44 |
| 39 | infinite | 2.000 | | |

Various data on zooming

| | telephoto end | middle | wide-angle end |
| --- | --- | --- | --- |
| focal length | 42.51 | 36.80 | 31.10 |
| F-number | 2.50 | 2.50 | 2.49 |
| T8 | 29.512 | 28.687 | 28.992 |

-continued

| | | | |
|---|---|---|---|
| T12 | 42.998 | 72.617 | 106.029 |
| T18 | 69.384 | 37.949 | 3.335 |
| T22 | 3.466 | 6.637 | 9.568 |
| T33 | 5.564 | 5.035 | 3.000 |

TABLE 3

| | | | |
|---|---|---|---|
| Pg, F | 0.5305 (L2, L8) | 0.5387 (L9) | 0.5871 (L5) |
| Vd | 70.44 (L2, L8) | 81.61 (L9) | 36.29 (L5) |
| CONDITIONAL EXPRESSION (1) | 0.658 (L2, L8) | 0.686 (L9) | 0.653 (L5) |
| Lr | 215.17 | | |
| L | 381.20 | | |
| CONDITIONAL EXPRESSION (2) | 0.564 | | |
| Lsf | 84.95 | | |
| Lsr | 25.00 | | |
| CONDITIONAL EXPRESSION (3) | 3.39 | | |
| ft | 42.50 | | |
| fw | 31.10 | | |
| CONDITIONAL EXPRESSION (4) | 1.36 | | |
| exp | −4696 (TELE) | −73447 (WIDE) | |
| CONDITIONAL EXPRESSION (5) | 151 (TELE) | 2361 (WIDE) | |
| Lw | 381.20 | | |
| CONDITIONAL EXPRESSION (6) | 0.066 | | |

Table 3 shows values of the conditional expressions (1) through (6) concerning the projection lens 1 in accordance with the third embodiment. Concerning the exit pupil position exp, a positive value indicates that the exit pupil position is on the enlargement side of a reduction-side image plane, and a negative value indicates that the exit pupil position is on the side opposite to the enlargement side of a reduction-side image plane.

FIGS. 21A through 23D are aberration diagrams of the projection lens 1 as Example 3 having the above lens arrangement and construction data. FIGS. 21A through 21D are aberration diagrams at the wide-angle end. FIGS. 22A through 22D are aberration diagrams in the middle focal length position. FIGS. 23A through 23D are aberration diagrams at the telephoto end. Referring to FIGS. 21A through 23D, FIGS. 21A, 22A, and 23A show spherical aberrations; FIGS. 21B, 22B, and 23B show astigmatisms; FIGS. 21C, 22C, and 23C show distortion aberrations, and FIGS. 21D, 22D, and 23D show lateral chromatic aberrations.

The following is a summary on the projection lens and the projector embodying the invention having the above arrangement.

(1) A projection lens according to an aspect of the invention is a projection lens constructed to perform a zooming operation by movable lens groups along an optical axis. The projection lens includes at least two movable lens groups to be moved in zooming, wherein one of the movable lens groups having a maximum moving amount includes at least one positive lens element having a positive power, the movable lens group having the maximum moving amount is arranged on an enlargement side with respect to a diaphragm, and is operable to move toward the diaphragm in zooming from a telephoto end to a wide-angle end, and the movable lens group having the maximum moving amount and the positive lens element satisfy the following conditional expressions (1) through (3)

$$Pg,F+0.00181 Vd>0.652 \quad (1)$$

$$0.5<Lr/L<0.8 \quad (2)$$

$$1.2<Lsf/Lsr<5 \quad (3)$$

where

Pg, F: a partial dispersion ratio of a lens glass material of the positive lens element, Vd: an Abbe number of the lens glass material of the positive lens element, Lr: a distance between an apex of a reduction-side lens surface in the movable lens group having the maximum moving amount, and an apex of a reduction-side lens surface in all the lens groups, in the case where the movable lens group having the maximum moving amount is moved to a position closest to the enlargement side in zooming, L: a lens length of all the lens groups, in the case where the movable lens group having the maximum moving amount is moved to the position closest to the enlargement side in zooming, Lsf: a distance between the apex of the reduction-side lens surface in the movable lens group having the maximum moving amount, and a surface of the diaphragm, in the case where the movable lens group having the maximum moving amount is moved to the position closest to the enlargement side in zooming, and Lsr: a distance between the apex of the reduction-side lens surface in the movable lens group having the maximum moving amount, and the surface of the diaphragm, in the case where the movable lens group having the maximum moving amount is moved to a position closest to a reduction side in zooming.

In the above arrangement, the conditional expression (3) means that the distance between the movable lens group having the maximum moving amount, and the diaphragm is variable during a zooming operation. Thereby, the light flux passing position can be greatly changed during a zooming operation. This is advantageous in producing a projection lens having an increased effect of correcting lateral chromatic aberration at either one of the telephoto end and the wide-angle end.

In the case where a projection lens is incorporated in a projector, it is necessary to minimize a change in light fastness by a zooming operation. As a result, the light flux width at the telephoto end where the focal length is long can be increased, as compared with the wide-angle end where the focal length is short.

In correcting lateral chromatic aberration at the wide-angle end where the light flux width is small, the correction amount may be increased at a periphery of a lens element, as compared with the center of the lens element. As a result, lateral chromatic aberration may remain at a portion near the center of a screen. In view of this, it is desirable to correct lateral chromatic aberration at the telephoto end. In the above arrangement, the movable lens group having the maximum moving amount is constructed to move toward the diaphragm in zooming from the telephoto end to the wide-angle end, and the conditional expression (1) is defined to correct lateral chromatic aberration at the telephoto end.

Specifically, the conditional expression (1) means that the positive lens element having an anomalous dispersion characteristic in the movable lens group having the maximum moving amount has Lang characteristic. This enables to increase the effect of correcting lateral chromatic aberration at the telephoto end in the plus direction.

Further, the conditional expression (2) means that the movable lens group having the maximum moving amount is arranged at a position closer to the enlargement side among all the lens groups. This arrangement facilitates correction of lateral chromatic aberration. Further, this arrangement enables to suppress variation in telecentricity by a zooming operation.

(2) Preferably, the projection lens may satisfy the conditional expression (4)

$$ft/fw>1.3 \quad (4)$$

where
ft: a focal length of the projection lens at the telephoto end, and
fw: a focal length of the projection lens at the wide-angle end.

In the above arrangement, the conditional expression (4) means that the zoom ratio is large. Thereby, usage environment of the projection lens can be made versatile.

(3) Preferably, the projection lens may satisfy the following conditional expression (5)

$$|exp/fw|>40 \quad (5)$$

where
exp: a paraxial exit pupil position, and
fw: a focal length of the projection lens at the wide-angle end.

In the above arrangement, the conditional expression (5) means that telecentricity is defined. If the left-side value of the conditional expression (5) is under the lower limit, the angle of off-axis light may be increased. An increased angle of off-axis light may lower the efficiency particularly in combining colors by a dichroic prism or extracting illumination light by a TIR prism.

(4) Preferably, the projection lens may satisfy the conditional expression (6)

$$Lsr/Lw<0.3 \quad (6)$$

where
Lsr: the distance between the apex of the reduction-side lens surface in the movable lens group having the maximum moving amount, and the surface of the diaphragm, in the case where the movable lens group having the maximum moving amount is moved to the position closest to the reduction side in zooming, and
Lw: a lens length of all the lens groups at the wide-angle end.

In the above arrangement, the conditional expression (6) means that the movable lens group having the maximum moving amount is close to the diaphragm at the wide-angle end. This enables to increase the effect of correcting lateral chromatic aberration at the telephoto end, without changing lateral chromatic aberration at the wide-angle end.

(5) Preferably, the projection lens may include at least one negative lens element having a negative power on the enlargement side with respect to the movable lens group having the maximum moving amount, and a lens glass material of the negative lens element may satisfy the conditional expression (1).

In the above arrangement, lateral chromatic aberration at the wide-angle end can be reduced, and the effect of correcting lateral chromatic aberration at the telephoto end can be increased in the movable lens group having the maximum moving amount. Thereby, lateral chromatic aberration in the entire zoom range can be reduced. This is advantageous in obtaining an optimal lens arrangement in correcting lateral chromatic aberration at the wide-angle end.

(6) Preferably, in the projection lens, the lens group provided at an end of the projection lens corresponding to the enlargement side may have a negative power.

In the above arrangement, since the lens group provided at an end of the projection lens corresponding to the enlargement side has a negative power, correction of lateral chromatic aberration is facilitated.

(7) Preferably, in the projection lens, the lens groups may be constituted of a first lens group having a negative power, a second lens group having a positive power, a third lens group having a positive power, a fourth lens group having a negative power, and a fifth lens group having a positive power in the order from the enlargement side, the second lens group, the third lens group, and the fourth lens group may be the movable lens groups, and the third lens group may be the movable lens group having the maximum moving amount.

(8) Preferably, in the projection lens, the lens groups may be constituted of a first lens group having a negative power, a second lens group having a positive power, a third lens group having a negative power, and a fourth lens group having a positive power in the order from the enlargement side, the second lens group and the third lens group may be the movable lens groups, and the second lens group may be the movable lens group having the maximum moving amount.

(9) Preferably, in the projection lens, the lens groups may be constituted of a first lens group having a negative power, a second lens group having a positive power, a third lens group having a positive power, a fourth lens group having a negative power, a fifth lens group having a positive power, and a sixth lens group having a positive power in the order from the enlargement side, the second lens group, the third lens group, the fourth lens group, and the fifth lens group may be the movable lens groups, and the third lens group may be the movable lens group having the maximum moving amount.

(10) Preferably, in the projection lens, the number of lens elements constituting all the lens groups may be eighteen or less.

The above arrangement enables to produce a projection lens at a less cost.

(11) A projector according to another aspect of the invention includes an image generator for generating an image; a light source for emitting light; an illumination optical system for guiding the light from the light source to the image generator; and the projection lens having one of the arrangements recited in (1) through (10), and for enlarging and projecting the image generated by the image generator as a light image onto a screen surface.

The above arrangement enables to provide a projector incorporated with the projection lens having one of the arrangements recited in (1) through (10).

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A projection lens comprising
at least two movable lens groups constructed to be moved in zooming, wherein
one of the movable lens groups having a maximum moving amount includes at least one positive lens element having a positive power,
the movable lens group having the maximum moving amount is arranged on an enlargement side with respect to a diaphragm, and is operable to move toward the diaphragm in zooming from a telephoto end to a wide-angle end, and
the movable lens group having the maximum moving amount and the positive lens element satisfy the following conditional expressions (1) through (3)

$$Pg,F+0.00181Vd>0.652 \quad (1)$$

$$0.5<Lr/L<0.8 \quad (2)$$

$$1.2<Lsf/Lsr<5 \quad (3)$$

where

Pg, F: a partial dispersion ratio of a lens glass material of the positive lens element, Vd: an Abbe number of the lens glass material of the positive lens element, Lr: a distance between an apex of a reduction-side lens surface in the movable lens group having the maximum moving amount, and an apex of a reduction-side lens surface in all the lens groups, in the case where the movable lens group having the maximum moving amount is moved to a position closest to the enlargement side in zooming, L: a lens length of all the lens groups, in the case where the movable lens group having the maximum moving amount is moved to the position closest to the enlargement side in zooming, Lsf: a distance between the apex of the reduction-side lens surface in the movable lens group having the maximum moving amount, and a surface of the diaphragm, in the case where the movable lens group having the maximum moving amount is moved to the position closest to the enlargement side in zooming, and Lsr: a distance between the apex of the reduction-side lens surface in the movable lens group having the maximum moving amount, and the surface of the diaphragm, in the case where the movable lens group having the maximum moving amount is moved to a position closest to a reduction side in zooming.

2. The projection lens according to claim 1, wherein the projection lens satisfies the following conditional expression (4)

$$ft/fw>1.3 \quad (4)$$

where ft: a focal length of the projection lens at the telephoto end, and fw: a focal length of the projection lens at the wide-angle end.

3. The projection lens according to claim 1, wherein the projection lens satisfies the following conditional expression (5)

$$|exp/fw|>40 \quad (5)$$

where exp: a paraxial exit pupil position, and fw: a focal length of the projection lens at the wide-angle end.

4. The projection lens according to claim 1, wherein the projection lens satisfies the conditional expression (6)

$$Lsr/Lw<0.3 \quad (6)$$

where

Lsr: the distance between the apex of the reduction-side lens surface in the movable lens group having the maximum moving amount, and the surface of the diaphragm, in the case where the movable lens group having the maximum moving amount is moved to the position closest to the reduction side in zooming, and Lw: a lens length of all the lens groups at the wide-angle end.

5. The projection lens according to claim 1, wherein the projection lens includes at least one negative lens element having a negative power on the enlargement side with respect to the movable lens group having the maximum moving amount, and a lens glass material of the negative lens element satisfies the conditional expression (1).

6. The projection lens according to claim 1, wherein the lens group provided at an end of the projection lens corresponding to the enlargement side has a negative power.

7. The projection lens according to claim 1, wherein the lens groups include a first lens group having a negative power, a second lens group having a positive power, a third lens group having a positive power, a fourth lens group having a negative power, and a fifth lens group having a positive power in the order from the enlargement side, the second lens group, the third lens group, and the fourth lens group are the movable lens groups, and the third lens group is the movable lens group having the maximum moving amount.

8. The projection lens according to claim 1, wherein the lens groups include a first lens group having a negative power, a second lens group having a positive power, a third lens group having a negative power, and a fourth lens group having a positive power in the order from the enlargement side, the second lens group and the third lens group are the movable lens groups, and the second lens group is the movable lens group having the maximum moving amount.

9. The projection lens according to claim 1, wherein the lens groups include a first lens group having a negative power, a second lens group having a positive power, a third lens group having a positive power, a fourth lens group having a negative power, a fifth lens group having a positive power, and a sixth lens group having a positive power in the order from the enlargement side, the second lens group, the third lens group, the fourth lens group, and the fifth lens group are the movable lens groups, and the third lens group is the movable lens group having the maximum moving amount.

10. The projection lens according to claim 1, wherein the projection lens further satisfies the following conditional expression (1)'

$$Pg,F+0.00181Vd>0.655 \quad (1)'.$$

11. A projector comprising:

an image generator for generating an image;

a light source for emitting light;

an illumination optical system for guiding the light from the light source to the image generator; and the projection lens of claim 1 for enlarging and projecting the image generated by the image generator as a light image onto a screen surface.

12. A projection lens comprising:

at least two movable lens groups constructed to be movable in zooming, wherein one of the movable lens groups having a maximum moving amount includes at least one positive lens element having a positive power, the movable lens group having the maximum moving amount is arranged on an enlargement side with respect to a diaphragm, and is operable to move toward the diaphragm in zooming from a telephoto end to a wide-angle end, the movable lens group having the maximum moving amount, and the positive lens element satisfy the following conditional expressions (1) through (3), $$Pg,F+0.00181Vd>0.652 \quad (1)$$

$$0.5<Lr/L<0.8 \quad (2)$$

$$1.2<Lsf/Lsr<5 \quad (3)$$

where

Pg, F: a partial dispersion ratio of a lens glass material of the positive lens element, Vd: an Abbe number of the lens glass material of the positive lens element, Lr: a distance between an apex of a reduction-side lens surface in the movable lens group having the maximum moving amount, and an apex of a reduction-side lens surface in all the lens groups, in the case where the movable lens group having the maximum moving amount is moved to a position closest to the enlargement side in zooming, L: a lens length of all the lens groups, in the case where the movable lens group having the maximum moving amount is moved to the position closest to the enlargement side in zooming, Lsf: a distance between the apex of the reduction-side lens surface in the movable lens group having the maximum moving amount, and a surface of the diaphragm, in the case where the movable lens group having the maximum moving amount is moved to the position closest to the enlargement side in zooming, and Lsr: a distance between the apex of the reduction-side lens surface in the movable lens group having the maximum moving amount, and the surface of the diaphragm, in the case where the movable lens group having the maximum moving amount is moved to a position closest to a reduction side in zooming, the projection lens satisfies the conditional expression (4)

$$ft/fw>1.3 \quad (4)$$

where ft: a focal length of the projection lens at the telephoto end, and fw: a focal length of the projection lens at the wide-angle end, the projection lens satisfies the conditional expression (5)

$$|exp/fw|>40 \quad (5)$$

where exp: a paraxial exit pupil position, and fw: the focal length of the projection lens at the wide-angle end, and the lens group provided at an end of the projection lens corresponding to the enlargement side has a negative power.

13. The projection lens according to claim 12, wherein the projection lens satisfies the conditional expression (6)

$$Lsr/Lw<0.3 \quad (6)$$

where

Lsr: the distance between the apex of the reduction-side lens surface in the movable lens group having the maximum moving amount, and the surface of the diaphragm, in the case where the movable lens group having the maximum moving amount is moved to the position closest to the reduction side in zooming, and Lw: a lens length of all the lens groups at the wide-angle end.

14. The projection lens according to claim 12, wherein the projection lens includes at least one negative lens element having a negative power on the enlargement side with respect to the movable lens group having the maximum moving amount, and a lens glass material of the negative lens element satisfies the conditional expression (1).

15. The projection lens according to claim 12, wherein the lens groups include a first lens group having a negative power, a second lens group having a positive power, a third lens group having a positive power, a fourth lens group having a negative power, and a fifth lens group having a positive power in the order from the enlargement side, the second lens group, the third lens group, and the fourth lens group are the movable lens groups, and the third lens group is the movable lens group having the maximum moving amount.

16. The projection lens according to claim 15, wherein the projection lens satisfies the conditional expression (6)

$$Lsr/Lw<0.3 \quad (6)$$

where

Lsr: the distance between the apex of the reduction-side lens surface in the movable lens group having the maximum moving amount, and the surface of the diaphragm, in the case where the movable lens group having the maximum moving amount is moved to the position closest to the reduction side in zooming, and Lw: a lens length of all the lens groups at the wide-angle end.

17. The projection lens according to claim 12, wherein the lens groups include a first lens group having a negative power, a second lens group having a positive power, a third lens group having a negative power, and a fourth lens group having a positive power in the order from the enlargement side, the second lens group and the third lens group are the movable lens groups, and the second lens group is the movable lens group having the maximum moving amount.

18. The projection lens according to claim 17, wherein the projection lens satisfies the conditional expression (6)

$$Lsr/Lw<0.3 \quad (6)$$

where

Lsr: the distance between the apex of the reduction-side lens surface in the movable lens group having the maximum moving amount, and the surface of the diaphragm, in the case where the movable lens group having the maximum moving amount is moved to the position closest to the reduction side in zooming, and Lw: a lens length of all the lens groups at the wide-angle end.

19. The projection lens according to claim 12, wherein the lens groups include a first lens group having a negative power, a second lens group having a positive power, a third lens group having a positive power, a fourth lens group having a negative power, a fifth lens group having a positive power, and a sixth lens group having a positive power in the order from the enlargement side, the second lens group, the third lens group, the fourth lens group, and the fifth lens group are the movable lens groups, and the third lens group is the movable lens group having the maximum moving amount.

20. The projection lens according to claim 19, wherein the projection lens satisfies the conditional expression (6)

$$Lsr/Lw<0.3 \quad (6)$$

where

Lsr: the distance between the apex of the reduction-side lens surface in the movable lens group having the maximum moving amount, and the surface of the diaphragm, in the case where the movable lens group having the maximum moving amount is moved to the position closest to the reduction side in zooming, and Lw: a lens length of all the lens groups at the wide-angle end.

* * * * *